United States Patent
Ishibashi et al.

(10) Patent No.: US 7,438,379 B2
(45) Date of Patent: Oct. 21, 2008

(54) ALIGNMENT PATTERN DETECTING SENSOR, METHOD OF DETERMINING ACCEPTANCE WIDTH OF THE ALIGNMENT PATTERN DETECTING SENSOR, METHOD OF FORMING ALIGNMENT PATTERN, AND IMAGE FORMING APPARATUS

(75) Inventors: Hitoshi Ishibashi, Tokyo (JP); Noboru Sawayama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/406,260

(22) Filed: Apr. 19, 2006

(65) Prior Publication Data

US 2006/0222419 A1   Oct. 5, 2006

Related U.S. Application Data

(63) Continuation of application No. 10/722,490, filed on Nov. 28, 2003, now Pat. No. 7,055,928.

(30) Foreign Application Priority Data

Nov. 29, 2002  (JP) .............................. 2002-347814
Nov. 29, 2002  (JP) .............................. 2002-347844

(51) Int. Cl.
*B41J 29/393*   (2006.01)
(52) U.S. Cl. ...................................................... 347/19
(58) Field of Classification Search .................... 347/19
See application file for complete search history.

(56) References Cited

U.S. PATENT DOCUMENTS

| 5,384,628 | A | 1/1995 | Takami et al. |
| 5,438,401 | A | 8/1995 | Murayama et al. |
| 5,623,330 | A | 4/1997 | Ishibashi |
| 5,627,649 | A | 5/1997 | Sawayama et al. |
| 5,630,195 | A | 5/1997 | Sawayama et al. |
| 5,659,843 | A | 8/1997 | Takano et al. |
| 5,729,353 | A | 3/1998 | Sawayama et al. |
| 5,761,570 | A | 6/1998 | Sawayama et al. |

(Continued)

FOREIGN PATENT DOCUMENTS

EP   1 074 894   2/2001

(Continued)

OTHER PUBLICATIONS

Patent Abstracts of Japan; JP 06-001002; Jan. 11, 1994.

(Continued)

*Primary Examiner*—Stephen D Meier
*Assistant Examiner*—Rene Garcia, Jr.
(74) *Attorney, Agent, or Firm*—Oblon, Spivak, McClelland, Maier & Neustadt, P.C.

(57) ABSTRACT

An image forming apparatus includes an alignment pattern and an alignment pattern detector that detects the alignment pattern. The alignment pattern is formed in such a manner that a line image of a reference color and a line image of a color other than the reference color are superposed on each other with a predetermined shift amount. An acceptance width of the alignment pattern detector is determined so that the acceptance width satisfies a relation with a writing density of the image forming apparatus and a line width of the alignment pattern, as follows:

[acceptance width]>[line width]/$(5.0627 \times [\text{writing density(dpi)}]^{-0.5331})$.

8 Claims, 28 Drawing Sheets

U.S. PATENT DOCUMENTS

| | | |
|---|---|---|
| 6,022,154 A | 2/2000 | Allen |
| 6,249,304 B1 | 6/2001 | Sawayama et al. |
| 6,342,910 B1 | 1/2002 | Sakamoto et al. |
| 6,360,065 B1 | 3/2002 | Ishibashi et al. |
| 6,408,156 B1 | 6/2002 | Miyazaki et al. |
| 6,415,129 B2 | 7/2002 | Sawayama |
| 6,470,161 B2 | 10/2002 | Fujishiro et al. |
| 6,505,022 B2 | 1/2003 | Kosuge et al. |
| 6,519,428 B1 | 2/2003 | Ohtoshi et al. |
| 6,546,219 B2 | 4/2003 | Sato et al. |
| 6,665,503 B2 | 12/2003 | Sawayama |
| 2003/0180057 A1 | 9/2003 | Sawada et al. |
| 2006/0222419 A1 | 10/2006 | Ishibashi et al. |

FOREIGN PATENT DOCUMENTS

| | | |
|---|---|---|
| JP | 7-19084 | 3/1995 |
| JP | 10-73980 | 3/1998 |
| JP | 10-329381 | 12/1998 |
| JP | 2000-81745 | 3/2000 |
| JP | 2001-134041 | 5/2001 |
| JP | 2001-209223 | 8/2001 |
| JP | 2002-40746 | 2/2002 |
| JP | 3254244 | 2/2002 |
| JP | 2002-229280 | 8/2002 |

OTHER PUBLICATIONS

U.S. Appl. No. 11/952,553, filed Dec. 7, 2007, Tomita et al.

CROSS SECTION OF A-A

DIRECTION OF TRANSFER BELT MOVEMENT

ASSUME ACCEPTANCE PLANE IS CIRCULAR (RADIUS: r=1.5)
ACCEPTANCE PLANE IS DIVIDED BY 1 DOT (d=25.4/600)

$$\cos \theta = a/r$$
$$\tan \theta = b/a$$
$$L = 2 \times b$$

$$b = a \times \tan \theta$$
$$= a \times \tan(\mathrm{acos}(a/r))$$

$$L = 2 \times b$$
$$= 2 \times [a \times \tan(\mathrm{acos}(a/r))]$$

PATCH A

PATCH B

PATCH A

PATCH B

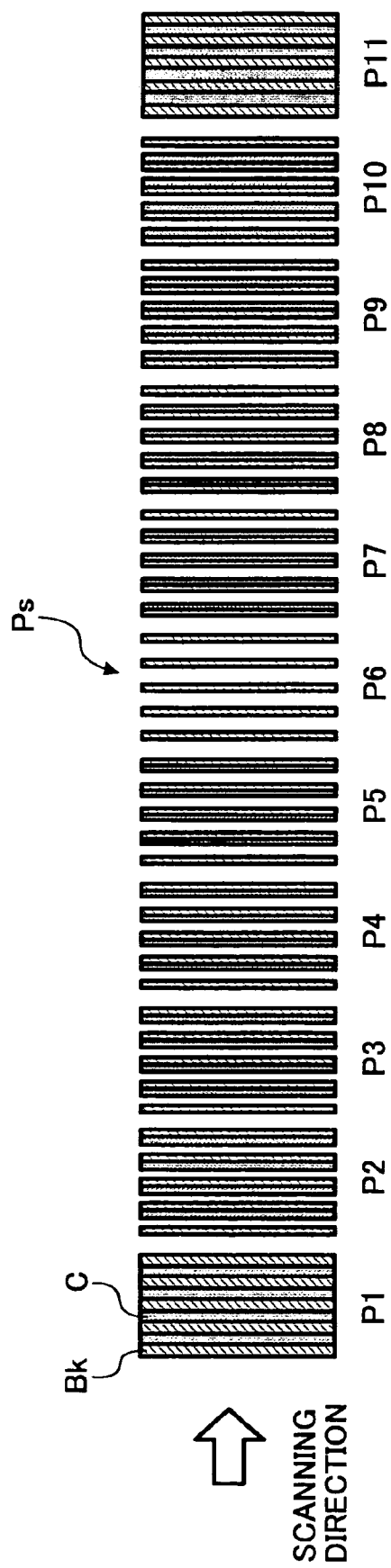

FIG. 37
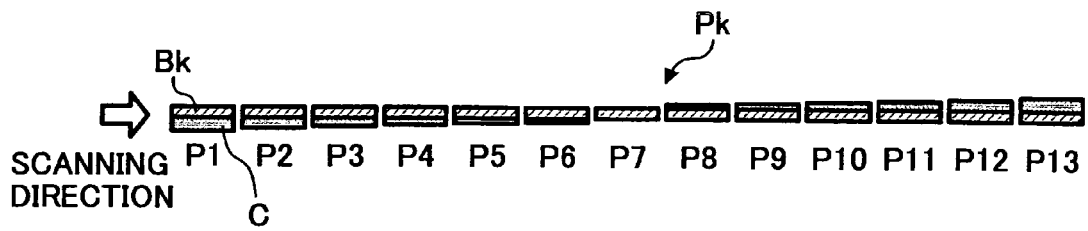
FIG. 38A
FIG. 38B
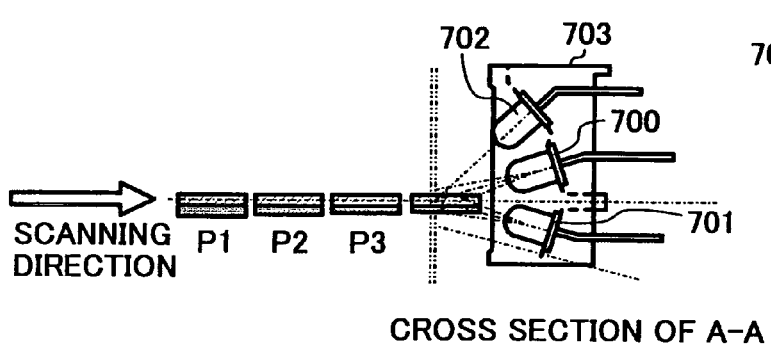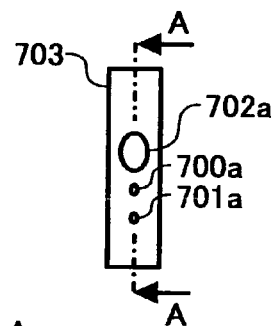
CROSS SECTION OF A-A
FIG. 39
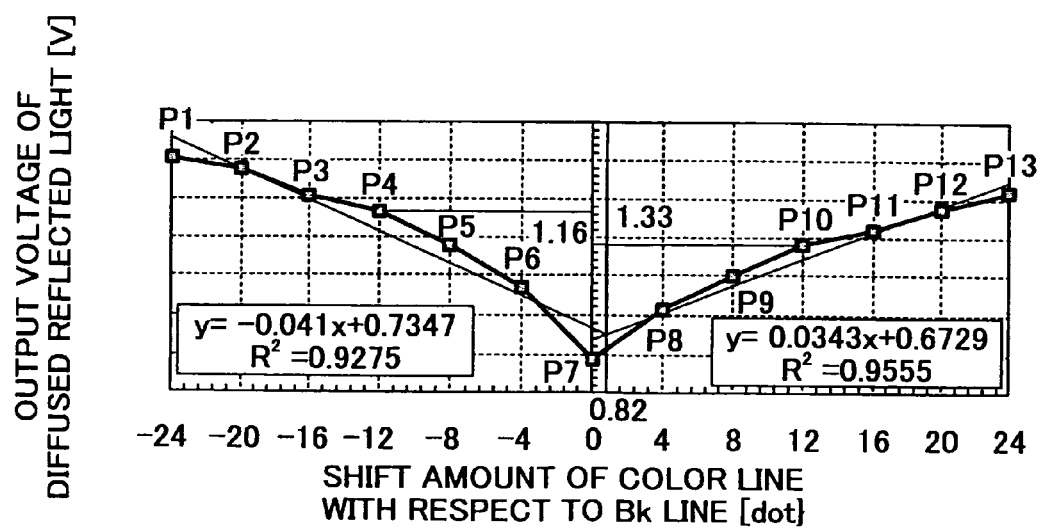

ALIGNMENT PATTERN DETECTING SENSOR, METHOD OF DETERMINING ACCEPTANCE WIDTH OF THE ALIGNMENT PATTERN DETECTING SENSOR, METHOD OF FORMING ALIGNMENT PATTERN, AND IMAGE FORMING APPARATUS

CROSS-REFERENCE TO RELATED APPLICATIONS

This document is a Continuation Application of and is based upon and claims the benefit of priority under 35 U.S.C. §120 from U.S. Ser. No. 10/722,490, filed Nov. 28, 2003. The present document also incorporates by reference the entire contents of Japanese priority document, 2002-347814 filed in Japan on Nov. 29, 2002 and 2002-347844 filed in Japan on Nov. 29, 2002.

BACKGROUND OF THE INVENTION

1) Field of the Invention

The present invention relates to an image forming apparatus that forms color images, an alignment pattern detecting sensor for the image forming apparatus, a method of determining an acceptance width for the alignment pattern detecting sensor, and a method of forming an alignment pattern.

2) Description of the Related Art

Conventionally, a color image forming apparatus that has a photosensitive drum and a revolver type developing device takes a main stream in the market. This type of color image forming apparatus forms toner images of respective colors, superposes the toner images on an intermediate transfer element to make a combined color image, forms toner images of respective colors, superposes the toner images on an intermediate transfer element to make a combined color image, and batch-transfers the combined color image to a recording medium.

On the other hand, with a recent demand of high speed and high performance for the color image forming apparatus, a four-drum tandem type color image forming apparatus has become popular. The tandem type color image forming apparatus has a configuration that a plurality of image forming units each including a pair of a photosensitive element (image carrier) and a developing device are disposed for each color at positions near a transfer belt, and toner images on the image carriers are sequentially transferred to a recording medium or a transfer belt to form the combined color image.

With this type of color image forming apparatus, since the toner images formed on the image carriers for respective colors can be transferred virtually at the same time, the tandem type color image forming apparatus has an advantage in that the printing speed can be increased. On the other hand, there is a disadvantage with respect to color misalignment between the respective colors, as compared to the conventional one-drum intermediate transfer type color image forming apparatus.

With regard to the technological problem of the color misalignment, many correction methods have been proposed. For example, Japanese Patent Kokoku No. Hei 7-19084 discloses a technology of correcting the color misalignment by forming line images for respective colors on a transfer belt, detecting passing of the line images by a detecting sensor, and measuring each offset from an ideal passing timing of the line images.

Since such a technology is a method of detecting an edge of a pattern passing through the detecting sensor, the detection accuracy is determined by the sampling frequency. In other words, if a machine has a resolution of 600 dpi and the correction unit is 42.3 micrometers (=25.4/600×1000), at least a detection of ±½ of the correction unit (=21.7 micrometers) is required. When the linear velocity of the line image on the transfer belt is 125 mm/sec, a minimum required sampling frequency is calculated as at least 6 kilohertz, from an equation of [sampling frequency]=[linear velocity]/[25.4/resolution dpi/2], but the detection accuracy (=detection error) in this case (=6 kHz) becomes 21.7 micrometers.

If this calculation is directly fed back to the misalignment correction, there may be no problem with such a degree of sampling frequency. However, there is a case where it is necessary to use this detection result (=x micrometers) for other operation. For example, when such detection is performed at left and right opposite ends of a recording medium with respect to the recording medium conveying direction and skew correction is performed or magnification error correction is performed, based on the detection results at the opposite ends, higher detection accuracy is required. Therefore, for example, when 2 micrometers are required as the detection accuracy, it is necessary to increase the sampling frequency to as high as 60 kilohertz.

Since the necessary sampling frequency is in proportion to the linear velocity and resolution, high processing speed capable of coping with the high-speed sampling becomes necessary for processing steps after the data sampling. Consequently, a cost required for color misalignment correction increases in substantial proportion to the increase in the speed of apparatus.

As detecting means for improvement in detection accuracy of pattern edge, a method of detecting the pattern edge by a charge coupled device (CCD) sensor having high accuracy and high resolution is proposed. However, even if such detecting means is used, problems such as complication and cost increase of the apparatus cannot be avoided.

For example, Japanese Patent No. 3254244 discloses the technology as follows. A toner image pattern is formed by superposing a second color toner image on a first color toner image and other toner image patterns are formed by shifting the relative position of the two color patterns by a predetermined amount. Each average density of the toner image patterns is detected by an optical sensor, and a misalignment between the first color and the second color and the direction of the misalignment are determined from output signals of the optical sensor to correct the misalignment.

In this technology, the detection of the misalignment is performed not by detecting the edge of a pattern image (line image), but by detecting an average output signal of the optical sensor based on the whole pattern. Therefore, it is possible to detect the misalignment at a sampling frequency as low as 500 hertz or below (for every 2 milliseconds), that is, about ¹⁄₁₀₀ times low as compared with the technology disclosed in Japanese Patent Kokoku No. Hei 7-19084.

Therefore, if a detection accuracy of the same level as that of the technology disclosed in Japanese Patent Kokoku No. Hei 7-19084 can be obtained by using the misalignment detection method disclosed in Japanese Patent No. 3254244, the hardware can be configured at a lower cost relating to the detection of misalignment, and therefore, considerable cost reduction can be obtained.

The technology similar to the misalignment detection method described in Japanese Patent No. 3254244 includes technologies disclosed, for example, in Japanese Patent Application Laid-Open No. Hei 10-329381, Japanese Patent Application Laid-Open No. 2000-81745, Japanese Patent Application Laid-Open No. 2001-209223, Japanese PatentApplication Laid-Open No. 2002-40746, and Japanese Patent Application Laid-Open No. 2002-229280.

With regard to the technology of misalignment correction disclosed in Japanese Patent No. 3254244, if the maximum correction amount that has to be corrected is ±10 dots, then the misalignment correction amount and the direction thereof can be determined by forming 21 patterns obtained through shifting the relative position of the two colors dot by dot and reading extreme values of the patterns.

However, creating that many patterns increases not only wasteful toner consumption, but also the time required for automatic misalignment adjustment, which is not desirable.

Japanese Patent Application Laid-Open No. Hei 10-329381 discloses a method of detecting a misalignment more accurately, by calculating an intersection point of two lines when a reflected optical density is plotted on the y-axis with respect to a printing position parameter plotted on the x-axis.

In the method disclosed in Japanese Patent Application Laid-Open No. Hei 10-329381, even if the maximum correction amount is ±10 dots, it is not necessary to form 21 patterns, and only 11 patterns may be formed through shifting by several dots appropriately, for example, by 2 dots. If the pattern is shifted by 5 dots, then only five patterns are required. Thus, highly accurate misalignment correction can be realized, while considerably reducing the number of patterns and the time required for misalignment adjustment.

Since misalignment adjustment is an operation that has nothing to do with the actual printing operation, if the processing time is too long, the time required for the first print increases accordingly. Therefore, the shorter time for the adjustment is better, considering the productivity.

However, there is a case where a positional deviation is obtained by calculating an intersection point of a linear approximate expression of two lines, and there is also a case where a deviation is obtained through arithmetic operation with a resolution having a shift amount of the line or less. In either of the cases, such an output characteristic as follows must be obtained. Specifically, a sensor output signal of each patch linearly increases or decreases with respect to a predetermined shift amount, that is, a line in which a determination coefficient $R^2$ of each approximate expression of two lines is infinitely close to 1, must be obtained.

Therefore, by using a one-drum intermediate transfer belt type color image forming apparatus (writing density: 600 dpi) as illustrated in FIG. 33, it is verified whether the same degree of detection accuracy as that of the edge detection method disclosed in Japanese Patent Kokoku No. Hei 7-19084 is obtained through density detection of a two-color superposed pattern and calculation of the intersection point. As illustrated in FIG. 37, a patch is formed by superposing two color lines of black (Bk) as a reference color and another color (for example, cyan (C)), and a patch is also formed as one line as the minimum number of the lines obtained by superposing the two color lines. A detection pattern (alignment pattern) Pk for misalignment detection in the main scanning direction is obtained by continuously forming 13 patches (P1 to P13) with the relative position of the two colors shifted by an arbitrary amount. This detection pattern is read by a conventional optical sensor (alignment pattern detecting sensor) as illustrated in FIG. 38A, and output voltages of each of the patches with respect to the shift amount of the line other than the reference color are plotted to calculate an intersection point. Experiments were conducted on two references of 24 dots and 10 dots as references for line widths of two colors. The reason why the one-drum intermediate transfer type image forming apparatus was used is because it is desirable to keep an influence of the apparatus from a verified result as low as possible. The pattern used for verification was used for the pattern in the main scanning direction for the same reason as explained above.

As illustrated in FIG. 37, the respective patches are arranged along the scanning direction of the optical sensor, i.e., the direction of the transfer belt movement, and the color other than the reference color is shifted by an arbitrary amount in a direction orthogonal to the direction of the movement, in order to detect color misalignment in the main scanning direction.

As illustrated in FIG. 38A and FIG. 38B, the optical sensor includes a light emitting diode (LED) 700, a regular reflected light receiving element 701, and a diffused light receiving element 702, and these elements are supported by a support base 703. These elements are actually arranged in a substantially vertical plane with respect to a moving plane of an alignment pattern, but FIG. 38A illustrates the arrangement as a plan view obtained by rotating it by 90 degrees for simplicity. As illustrated in FIG. 38B, the support base 703 has a spot shape 700*a* of the LED 700, a spot shape 701*a* of the regular reflected light receiving element 701, and a spot shape 702*a* of the diffused light receiving element 702.

FIG. 39 illustrates the result of a case where the line width is 24 dots, and FIG. 40 illustrates the result of a case where the line width is 10 dots.

As illustrated in FIG. 39, in the case of the line width: 24 dots, in the approximate line obtained by plotted points on the negative side with respect to the extreme value, $R^2$ is 0.9275. On the other hand, in the approximate line obtained by plotted points on the positive side with respect to the extreme value, $R^2$ is 0.9555. Thus, the obtained output characteristic is not a straight line at all.

As a result of calculation of an intersection point based on the two approximate lines, a positional deviation of 34.74 micrometers (=0.82 dot) is obtained.

On the other hand, as illustrated in FIG. 40, in the case of the line width: 10 dots, in the approximate line obtained by plotted points on the negative side with respect to the extreme value, $R^2$ is 0.9909. On the other hand, in the approximate line obtained by plotted points on the positive side with respect to the extreme value, $R^2$ is 0.9985. Thus, the output characteristic quite close to a straight line is obtained.

As a result of calculation of an intersection point by the two approximate lines, a positional deviation of 12.91 micrometers (=0.30 dots) is obtained. The experiment conditions are as follows.

Detailed Parameters of the Detection Pattern as illustrated in FIG. 39:
    Line width: 24 dots (=25.4/600×1000×24=1.016 millimeters) . . . commonly set for the Bk line and the color line
    Shift amount: 4 dots (=25.4/600×1000×4=169.3 micrometers)
    Total number of patches: 13 patches (at P1 and P13, the two lines are not superposed perfectly, but at P7, the two lines are perfectly superposed on each other)
    Repetition number of line: 1

Detailed Parameters of the Detection Pattern as illustrated in FIG. 40:
    Line width: 10 dots (=25.4/600×1000×10=0.423 millimeters) . . . commonly set for the Bk line and the color line
    Shift amount: 1 dot (=25.4/600×1000×1=42.3 micrometers)
    Total number of patches: 21 patches (at P1 and P21, the two lines are not superposed perfectly, but at P11, the two lines are perfectly superposed on each other)

Repetition number of line: 1

Detecting Sensor (detailed specification of the sensor as illustrated in FIG. 38A and FIG. 38B):

Light Emission Side:
  Element: GaAs infrared light emitting diode (peak emission wavelength, $\lambda_p$=950 nanometers)
  Top view type spot diameter: 1.0 millimeter Light Reception Side:
  Element: Si phototransistor (peak spectral sensitivity, $\lambda_p$=800 nanometers)
  Top view type spot diameter:
    Regular reflected light receiving side: 1.0 millimeter
    Diffused light receiving side: 3.0 millimeters
  Detection distance: 5 millimeters (distance from upper part of the sensor to a target surface (patch) to be detected)

Linear Velocity:
  245 mm/sec [sampling frequency]
  500 sampling/sec

In the experiments, the alignment pattern was formed on the transfer belt so as to substantially match between the center of the Bk line and the center of the light receiving plane of the sensor.

As explained above, it is confirmed that the linearity as a basis of calculation of the intersection point is changed due to different line widths. This means that the detection accuracy of misalignment can be further improved by using a more appropriate method of forming the alignment pattern. In other words, this means that improvement in the detection accuracy of misalignment is achieved without cost increase.

SUMMARY OF THE INVENTION

It is an object of the present invention to solve at least the problems in the conventional technology.

The method of determining an acceptance width for an alignment pattern detector according to one aspect of the present invention includes deriving a correlation between a line width of the alignment pattern, a writing density of the image forming apparatus, and the acceptance width of the alignment pattern detector, and determining the acceptance width based on the correlation derived.

The method of forming an alignment pattern for an image forming apparatus according to another aspect of the present invention includes deriving a correlation between a line width of the alignment pattern, a writing density of the image forming apparatus, and an acceptance width of the alignment pattern detector, determining the line width based on the correlation derived, and forming the alignment pattern on a medium based on the line width determined.

The alignment pattern detecting sensor according to still another aspect of the present invention detects an alignment pattern on a medium in an image forming apparatus. The alignment pattern is formed on a medium by superposing a line image of a reference color and a line image of a sample color other than the reference color, and an acceptance width of the alignment pattern detecting sensor is determined from following inequality

[acceptance width]>[line width]/($\alpha \times$[writing density (dpi)]$^{-\beta}$).

The image forming apparatus according to still another aspect of the present invention includes an alignment pattern forming unit that forms an alignment pattern on a medium by superposing a line image of a reference color and a line image of a sample color other than the reference color, an alignment pattern detector that detects the alignment pattern, and a misalignment correcting unit that, based on output signals of the alignment pattern detector, determines an amount and a direction of a misalignment between the line images of the two colors, and corrects the misalignment. The acceptance width of the alignment pattern detector, a line width of the alignment pattern, and a writing density of the image forming apparatus satisfy following inequality

[acceptance width]>[line width]/($\alpha \times$[writing density (dpi)]$^{-\beta}$).

The computer program for determining an acceptance width for an alignment pattern detector, which detects an alignment pattern in an image forming apparatus, according to still another aspect of the present invention makes a computer execute the method of determining an acceptance width for an alignment pattern detector according to the present invention.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 29 is a schematic diagram of the alignment pattern for misalignment detection in the sub-scanning direction;

FIG. 37 is a schematic diagram of an alignment pattern formed by superposing two color lines;

FIGS. 38A and 38B are schematic diagrams for explaining an arrangement of respective elements in the conventional optical sensor, with respect to the scanning direction of the alignment pattern;

FIG. 39 is a graph of the output voltages of the misalignment pattern with a line width of 24 dots and a calculation result of the intersection point, when the conventional optical sensor is used.

DETAILED DESCRIPTION

Figure 1:
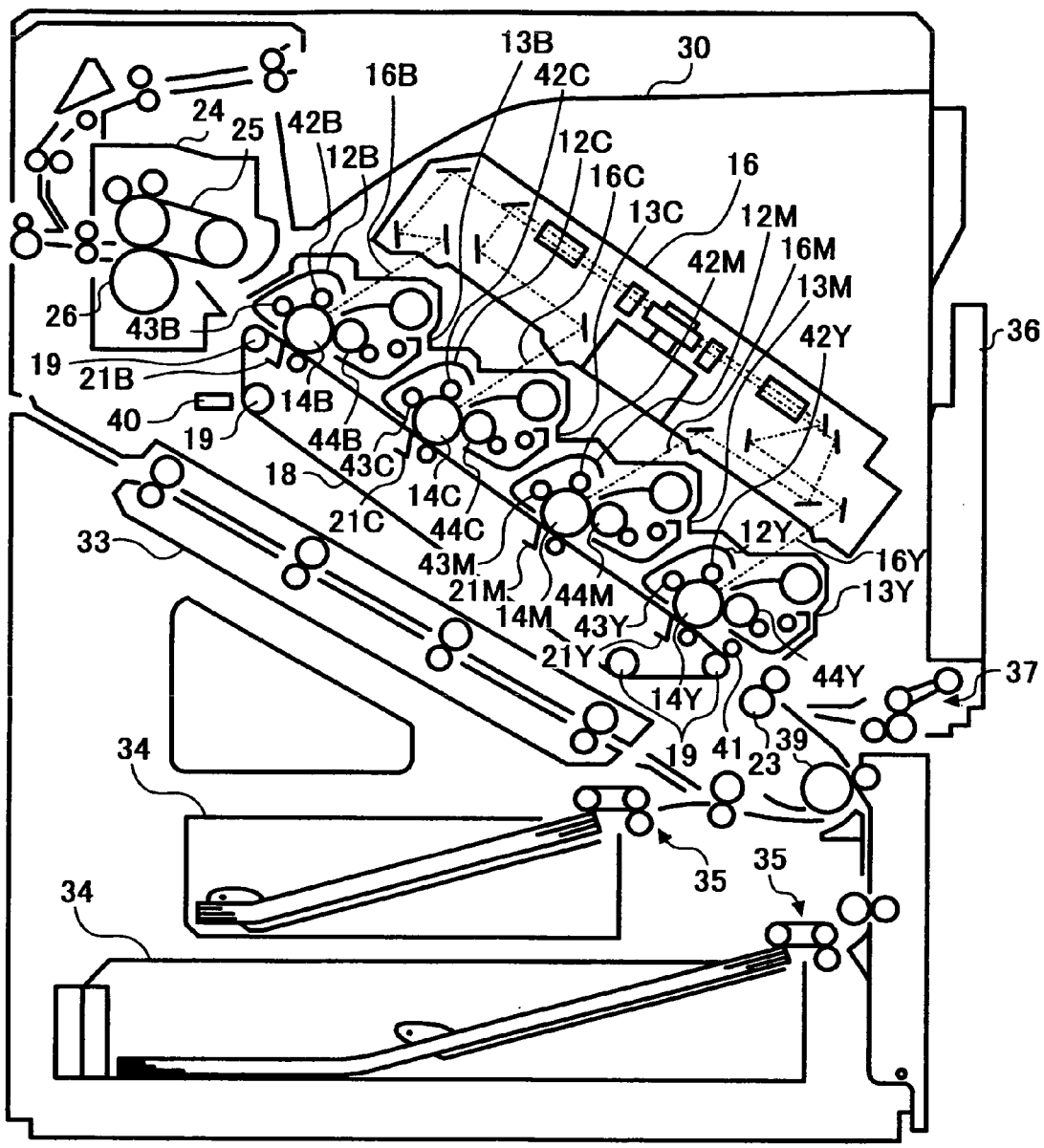
FIG. 1 is a schematic diagram of a color printer as an image forming apparatus according to the first embodiment of the present invention.

Exemplary embodiments of an alignment pattern detecting sensor, a method of determining acceptance width of the alignment pattern detecting sensor, a method of forming alignment, and an image forming apparatus according to the present invention is explained in detail with reference to the accompanying drawings FIG. 1 is a schematic diagram of a color printer as an image forming apparatus according to the first embodiment of the present invention. The color printer has three paper feed trays, one manual feed tray 36, and two paper feed cassettes 34 (first paper feed tray) and 34 (second paper feed tray). Recording medium (not shown) as a sheet-type recording medium fed by the manual feed tray 36 is separated one by one sequentially from the uppermost sheet by a feed roller 37, and conveyed toward a registration roller pair 23. Recording medium fed from the first paper feed tray 34 or the second paper feed tray 34 is separated one by one sequentially from the uppermost sheet by a feed roller 35, and conveyed toward the registration roller pair 23 via a conveying roller pair 39.

The fed recording medium is once stopped by the registration roller pair 23, and skew is corrected. Thereafter, the recording medium is conveyed toward a transfer belt 18 by a rotation operation of the registration roller pair 23 by ON control of a registration clutch (not shown), at a timing at which the front end of an image formed on a photosensitive drum 14Y, explained later, located on the uppermost stream and a predetermined position of the recording medium in its conveying direction coincide with each other.

When the recording medium passes through a nip for attracting a paper, the nip being formed with the transfer belt 18 and a paper attraction roller 41 in contact with the belt 18, the recording medium is electrostatically attracted to the transfer belt 18 by a bias applied to the paper attraction roller 41, and conveyed at a process linear velocity of 125 mm/sec.

Transfer bias (positive) having a polarity opposite to the charged polarity (negative) of the toner is applied to transfer brushes 21B, 21C, 21M, and 21Y arranged at positions facing the photosensitive drums 14B, 14C, 14M, and 14Y of the respective colors, with the transfer belt 18 put between the brushes and drums. Thereby, toner images in the respective colors formed on the photosensitive drums 14B, 14C, 14M, and 14Y are transferred to the recording medium attracted to the transfer belt 18, in order of yellow (Y), magenta (M), cyan (C), and black (Bk).

The recording medium having passed through transfer steps for the colors is separated from the transfer belt 18 by the curvature of a drive roller 19 provided on the downstream side, and conveyed to a fixing device 24. By passing through a nip for fixing the image, the nip being formed with a fixing belt 25 and a pushing roller 26 in the fixing device 24, the toner image is transferred to the recording medium by heat and pressure. The recording medium with the image fixed thereon is ejected to an image face-down (FD) tray 30 formed on the upper surface of the body of the apparatus, in a single-sided printing mode.

When a double-sided printing mode is selected in advance, the recording medium output from the fixing device 24 is conveyed to a reversing unit (not shown), the recording medium is turned upside down therein, and conveyed to a double-sided conveying unit 33 located below the transfer unit. The recording medium is re-fed from the double-sided conveying unit 33, and conveyed to the registration roller pair 23 via the conveying roller pair 39. Thereafter, through the similar operation to that in the single-sided printing mode, the recording medium passes the fixing device 24 and is ejected to the FD tray 30.

The image forming section is provided in plurality for the respective colors, and the image forming sections have the same configuration and operation as each other. Therefore, only the configuration and operation for forming a yellow image are representatively explained herein.

An image forming unit 12Y that has a charging roller 42Y and a cleaning unit 43Y, a developing unit 13Y, and an optical write unit 16 are provided around the photosensitive drum 14Y located on the most upstream side in the direction of conveying the recording medium.

At the time of image forming, the photosensitive drum 14Y is rotated in the clockwise direction by a main motor (not shown), and decharged by alternate current (AC) bias (having no direct current (DC) component) applied to the charging roller 42Y, and thereby, the surface potential becomes a reference potential of about −50 volts.

The photosensitive drum 14Y is uniformly charged to a potential substantially equal to the DC component by applying the DC bias on which the AC bias is superposed, to the charging roller 42Y, and the surface potential thereof is charged substantially to −500 volts to −700 volts (the target charged potential is determined by a process controller).

The digital image information as a print image sent from a controller (not shown) is converted to a binary LD light emission signal for each color, and exposure light 16Y is radiated onto the photosensitive drum 14Y by the optical write unit 16 including a cylinder lens, a polygon motor, an f/θ lens, first to third mirrors, a WTL lens, and the like.

The potential on the light radiated surface of the drum becomes substantially −50 volts, and an electrostatic latent image corresponding to the image information is formed at a writing density (=resolution) of 600 dpi.

The electrostatic latent image corresponding to the yellow image information on the photosensitive drum 14Y is visualized by the developing unit 13Y. By applying DC (−300 to −500 v) on which AC bias is superposed to a developing sleeve 44Y in the developing unit 13Y, only the image portion where the potential has dropped due to writing is developed with toner (Q/M, −20 to −30 μC/g), and a toner image is formed. The developing unit 13Y is a developing device using a so-called two-component developer, in which a mixed developer of carrier and toner are contained.

The toner image formed on each of the photosensitive drums 14B, 14C, 14M, and 14Y for respective colors is transferred to the recording medium attracted to the transfer belt 18, by the transfer bias.

In the color printer of the embodiment, prior to such image forming operation, color misalignment is adjusted. The color misalignment adjusting operation is performed by forming an alignment pattern explained later on the transfer belt 18, and reading (detecting) the alignment pattern by the alignment pattern detecting sensor (hereinafter, "sensor") 40 as an alignment pattern detector.

The alignment pattern detecting sensor 40 is arranged on the lower side of the transfer belt 18, facing the photosensitive drum 14B.

Figure 2:
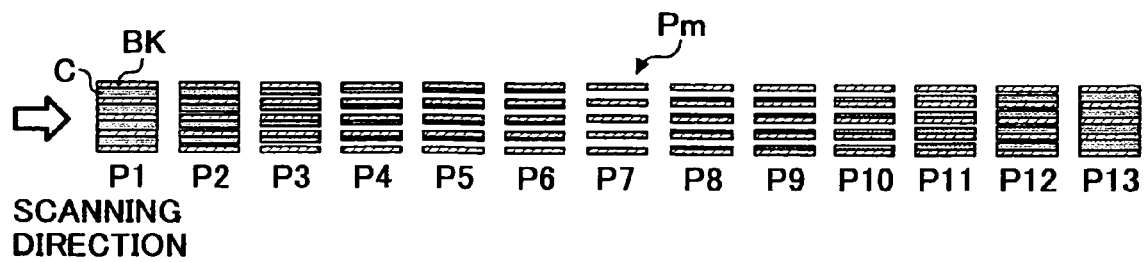
FIG. 2 is a schematic diagram of an alignment pattern for misalignment detection in the main scanning direction.

An alignment pattern Pm for detecting a misalignment in the main scanning direction is obtained as illustrated in FIG. 2, by designating a plurality of lines, as one patch, formed by superposing the line image Bk of black as the reference color and a line image of a color other than the reference color such as a line image C of cyan, and continuously forming patches by shifting the relative position of the line images of the two colors by an arbitrary amount (by an arbitrary shift amount). However, it does not mean that the reference color is restricted to black (the same applies in the other embodiments as follows).

Here, "arbitrary shift amount" includes a case when the shift amount is not always constant, such that a shift amount between P1 and P2 is 50 micrometers, and a shift amount between P2 and P3 is 20 micrometers.

In this embodiment, the alignment pattern Pm has a configuration such that one patch is formed by superposing a black line having a width of 250 micrometers on a color line other than the reference color having the same width, and the whole pattern is formed with 13 pieces of such patches. In the respective patches, each color line C is shifted by 40 micrometers with respect to each Bk line.

Here, "continuously forming patches" means that the patches are arranged along the scanning direction (in the advance direction of the transfer belt 18). Therefore, even if the patches are arranged on a random basis, such as in order of P1, P11, P2, and P10, this case is also included in "continuously forming". Even if the interval between P1 and P2 is not the same as the interval between P2 and P3, this case is also included in "continuously forming".

Figure 3A:
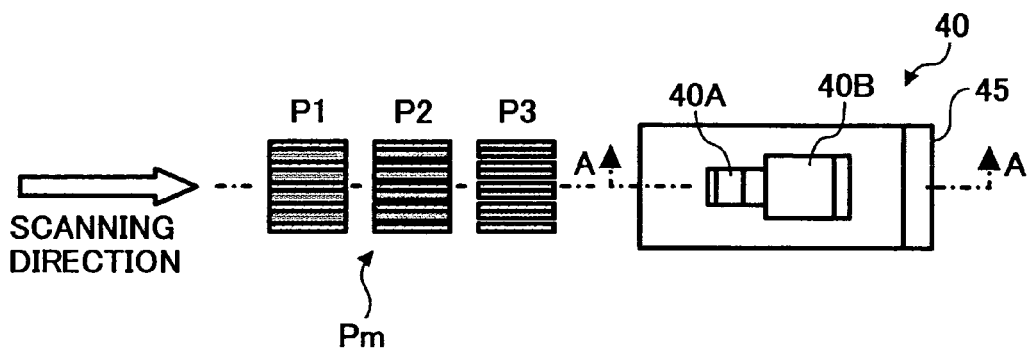
FIG. 3A and FIG. 3B are schematic diagrams for explaining an arrangement of the alignment pattern detecting sensor with respect to the scanning direction of the alignment pattern.
Figure 3B:
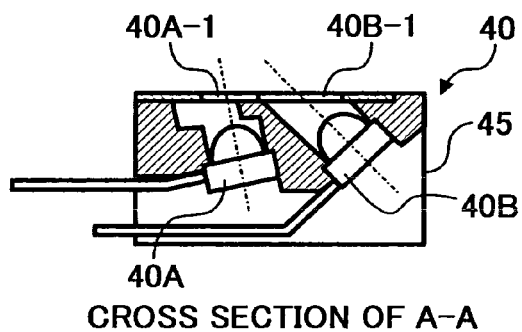

The alignment pattern detecting sensor 40 in the embodiment has the same configuration as that of the conventional sensor as illustrated in FIG. 38A and FIG. 38B. In other words, as illustrated in FIG. 3A and FIG. 3B, the detecting sensor 40 includes a light emitting diode (LED) 40A as a light emitter, a regular reflected light receiving element (phototransistor) 40B as a light receiver, and a diffused light receiving element (phototransistor) 40C (not shown) as a light receiver. These elements are supported by the support base 40D (not shown). Reference numeral 40A-1 represents a spot shape of the LED 40A, 40B-1 represents a spot shape of the regular reflected light receiving element 40B, and 40C-1 (not shown) is a spot shape of the diffused light receiving element 40C (not shown). The specifications of the alignment pattern detecting sensor 40 are as follows. Detecting Sensor (detailed specification of the sensor as illustrated in FIG. 3A and FIG. 3B):

Light Emission Side:
  Element: GaAs infrared light emitting diode (peak emission wavelength, $\lambda_p$=950 nanometers)
  Top view type spot diameter: 1.0 millimeter Light Reception Side:
  Element: Si phototransistor (peak spectral sensitivity, $\lambda_p$=800 nanometers)
  Top view type spot diameter:
    Regular reflected light receiving side: 1.0 millimeter
    Diffused light receiving side: 3.0 millimeters Detection distance: 5 millimeters (distance from upper part of the sensor to a target surface (patch) to be detected)

Figure 4:
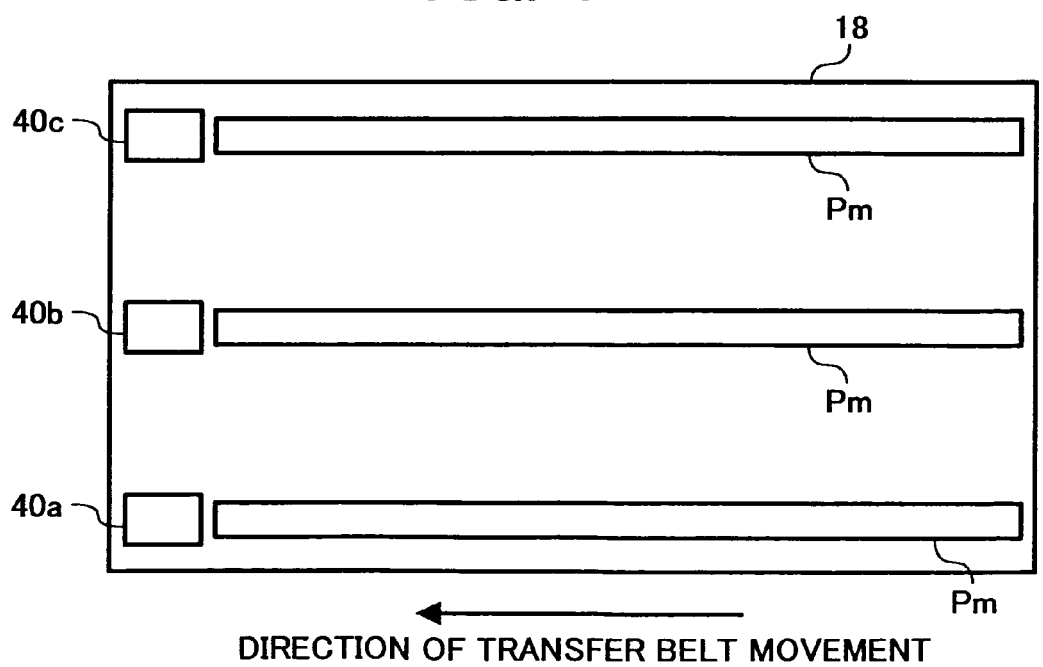
FIG. 4 is a schematic diagram for explaining a positional relation between the alignment pattern on the transfer belt and the alignment pattern detecting sensor.

The alignment patterns Pm are formed at three positions, opposite ends and the center of the transfer belt 18 as illustrated in FIG. 4. Corresponding three pieces (40a, 40b, 40c) of the alignment pattern detecting sensor 40 are provided by being supported by support bases (not shown). The two sensors provided at the opposite ends of the transfer belt 18 detect a misalignment of the alignment pattern Pm for detecting a misalignment in the main scanning direction as illustrated in FIG. 2 to thereby correct the misalignment in the main scanning direction and a magnification error. The three sensors provided at the opposite ends and the center of the transfer belt 18 detect a misalignment of an alignment pattern Ps for detecting a misalignment in the sub-scanning direction as illustrated in FIG. 29 to thereby correct the misalignment in the sub-scanning and skew.

The color printer as the image forming apparatus of the embodiment has a writing density of 600 dpi. Accordingly, a line width of each patch in the alignment pattern Pm and an acceptance width of the alignment pattern detecting sensor 40 are set so as to satisfy relations between them as follows.

[line width/acceptance width]<5.0627×[writing density]$^{-0.5331}$

[left side]=[line width/acceptance width]=[0.25/3.0]
=0.0833

[right side]=5.0627×[writing density]$^{-0.5331}$=0.167

Therefore, [left side]<[right side] is satisfied.

The reason of setting such conditions in correlation among the line width, acceptance width, and the writing density, that is, the approach of embodying the present invention and the basis of the present invention are explained below.

As illustrated in FIG. 39, an output characteristic, obtained in the misalignment detection by the conventional optical sensor, is not a straight line at all.

Figure 6:
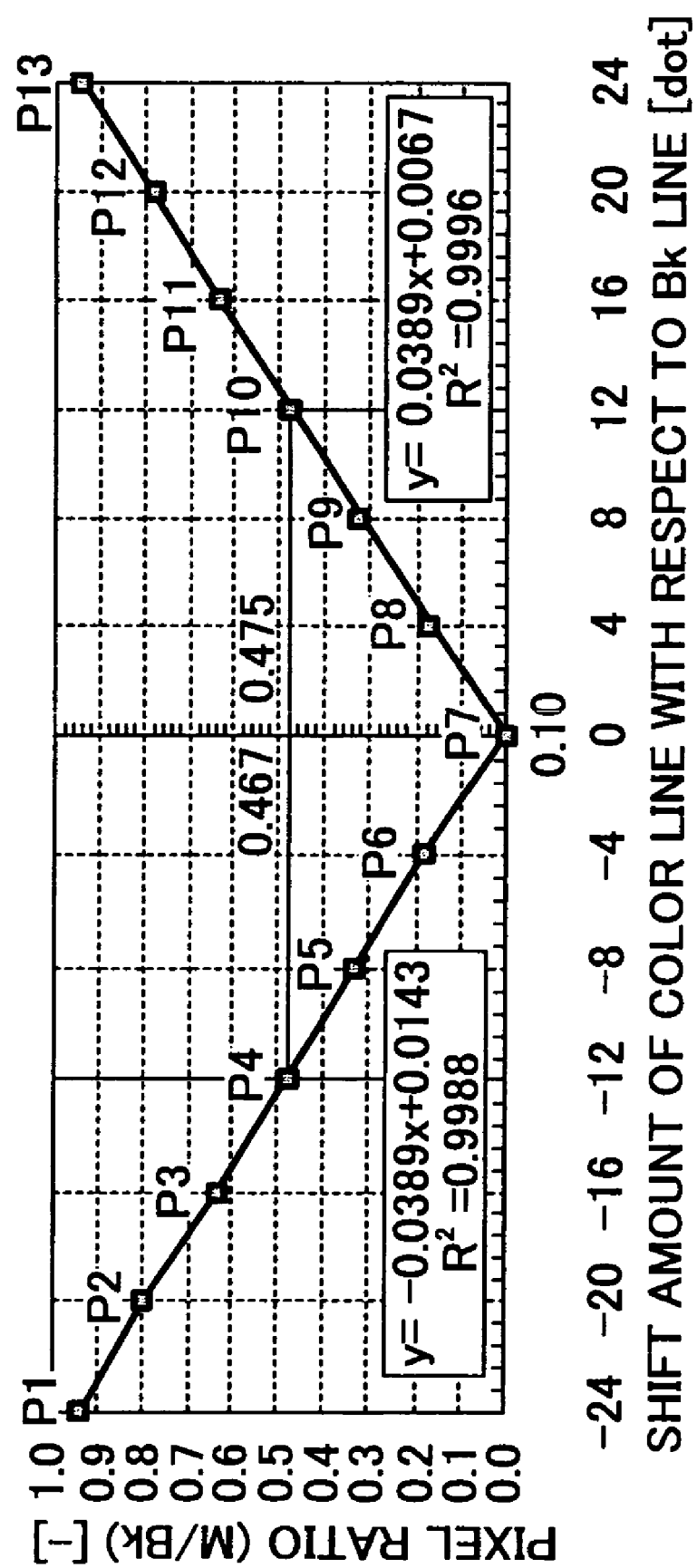
FIG. 6 is a graph of actually measured values of the color line width in each patch with respect to the Bk line using a microscope.

However, as a result of measuring an actual deviation of an alignment pattern formed on the transfer belt 18 by a digital microscope equipped with 2,000,000-pixel CCD, the deviation at P7 is substantially zero as illustrated in FIG. 6. More specifically, at P7, the two lines in a pattern, in which the line width is set to 24 dots, are perfectly superposed on each other.

In the approximate line obtained by plotted spots on the negative side with respect to the extreme value, $R^2$ is 0.9988, and in the approximate line obtained by plotted spots on the positive side with respect to the extreme value, $R^2$ is 0.9996. That is, a result infinitely close to the straight line ($R^2$=1) is obtained.

As a result of calculating an intersection point by the two lines, a positional deviation is 4.13 micrometers, and actually, the positional deviation is a value substantially close to zero. In a pattern in which the line width is set to 10 dots, a deviation of the pattern on the transfer belt 18 is measured in the above manner to obtain the deviation of almost zero.

As explained above, the deviation of the pattern on the transfer belt detected by the digital microscope is almost zero in the two references as the line width. However, when the line width is set to 24 dots, an extremely bad result is obtained such that the positional deviation is 34.74 micrometers through calculation based on the output of a misalignment detecting sensor. This deviation is far from the maximum tolerance of the detection error at 600 dpi (=±25.4/resolution dpi×1000/2 [μm]=±21.2 [μm]). Therefore, the difference between the two patterns (24-dot pattern and 10-dot pattern) may be caused by a measurement system.

In order to consider the difference between the two, the relation between the light receiving diameter of the sensor and a pattern is illustrated in FIG. 7A to FIG. 7C and FIG. 8A to FIG. 8C.

Figure 7A:
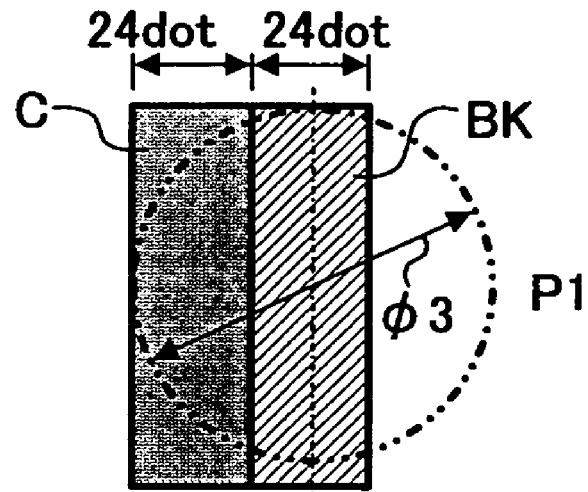
FIG. 7A to FIG. 7C are schematic diagrams for explaining a non-linearity in an increase in each area caused by a circular light receiving plane of the alignment pattern detecting sensor (with 24-dot line width)
Figure 7B:
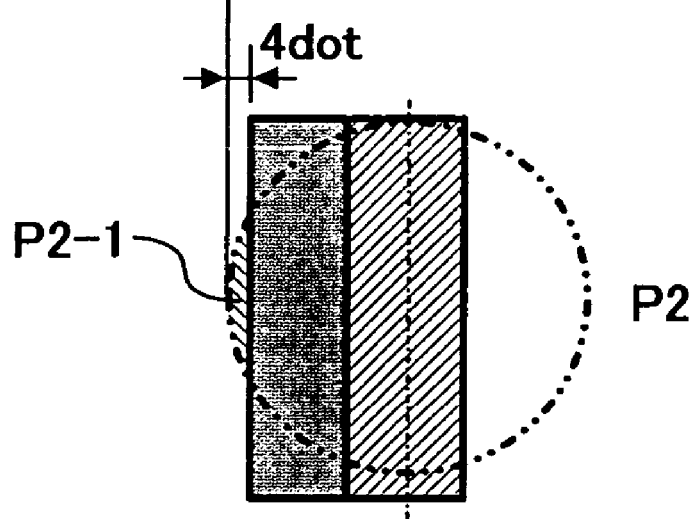
Figure 7C:
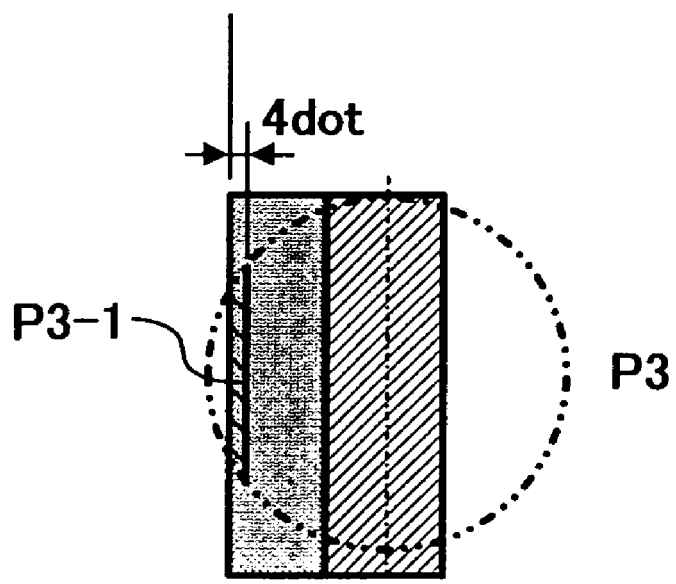
Figure 8A:
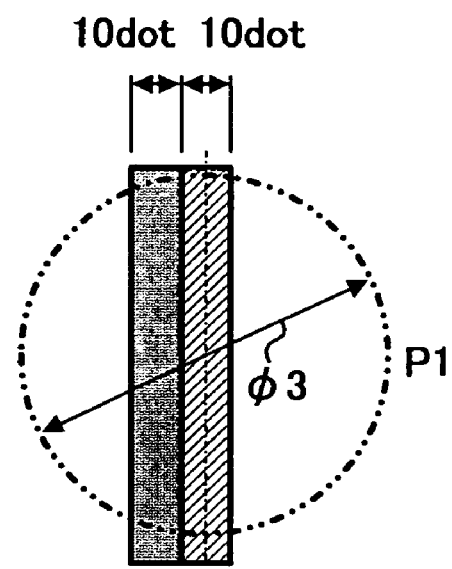
FIG. 8A to FIG. 8C are schematic diagrams for explaining a non-linearity in an increase in each area caused by a circular light receiving plane of the alignment pattern detecting sensor (with 10-dot line width)
Figure 8B:
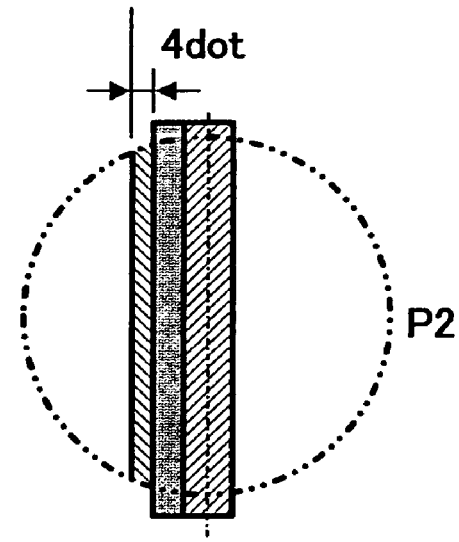
Figure 8C:
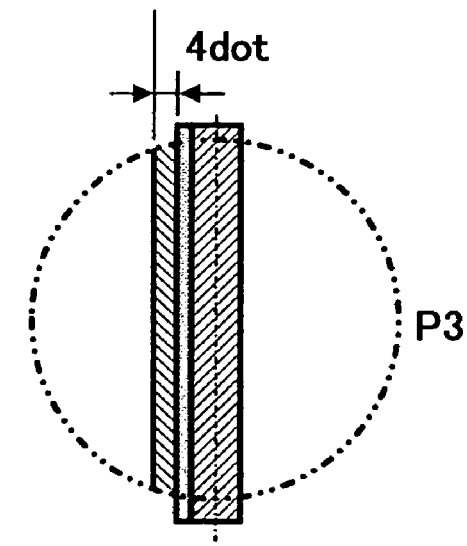

Patches P1 to P3 as illustrated in FIG. 7A to FIG. 7C are formed with 24-dot lines, and patches P1 to P3 as illustrated in FIG. 8A to FIG. 8C are formed with 10-dot lines. The shift amount of the lines in P1 and P2 and that in P2 and P3 are formed with 4 dots in order to compare them with each other on the same basis.

In the experiments, both of the patches with 24-dot lines and the patches with 10-dot lines make each center of the Bk line coincide with the center of the light receiving plane.

It is assumed that the output voltage of the diffused light from the sensor has a certain correlation with an increase in the area of a color line portion in the light receiving plane. Therefore, if the increase in the area is constant with respect to the difference (in this case, 4 dots) between the deviations of the adjacent patches, the output voltage should be linear.

However, as is obvious from FIG. 7A to FIG. 7C, if the line width is wide as 24 dots, the effect of the "circular" light receiving plane becomes evident. Therefore, if "a variation in the area (P2-1) with respect to the shift of the color line by 4 dots in P1 and P2" is compared with "a variation in the area (P3-1) with respect to the shift of the color line by 4 dots in P2 and P3", the variation becomes larger in the latter. In other words, the variation is not linear.

This means that if the light receiving plane is circular and the line width is wide (which does not mean "acceptance width<line width") with respect to a acceptance width (which coincides with the light receiving diameter of a light receiving sensor, in this case), then the detection accuracy is likely to be affected by the shape of the light receiving plane.

When the measurement was conducted by the digital microscope, the circular shape of the light receiving plane was not taken into account. Then, an enlarged photograph of a patch image observed by the digital microscope was captured into a personal computer in a TIFF format, a part of the patch was cut out to a rectangular area, and an intersection point was calculated by calculating an area ratio between the color line and the Bk line in the rectangular area. Consequently, the circular effect (nonlinearity of output) did not become evident.

Photoshop 5.5 produced by Adobe Systems Inc. was used for the software for image processing through measurement by the digital microscope.

Based on the result of the experiment, it is estimated that a certain relation between the line width of the alignment pattern and the acceptance width of the alignment pattern detecting sensor is required to be satisfied in order to ensure required detection accuracy when a deviation is detected with resolution of an arbitrary shift amount or less in an image forming apparatus. More specifically, the image forming apparatus includes an alignment pattern obtained by designating a plurality of lines, as one patch, formed by superposing a line image of black as a reference color and a line image of a color other than the reference color, and continuously forming patches in such a manner that a relative positional relation of the two color line images is shifted by an arbitrary amount. The image forming apparatus also includes an alignment pattern detecting sensor (alignment pattern detector) that detects the alignment pattern, and a corrector that determines a misalignment between the reference color and the other color and a direction of the misalignment from the output signals of the alignment pattern detecting sensor, and corrects the misalignment. Further, with regard to the case where a misalignment is detected with a resolution of an arbitrary shift amount or less, the method of calculating an intersection point using the two approximate expressions has been explained as one example of calculation algorithm, but the algorithm is not limited to this example. It is also possible to detect a misalignment with a resolution of the shift amount or less simply by performing arithmetic operation through comparison of differential outputs between the patches.

In order to derive this relation, it is assumed that "the output of the diffused light of the alignment pattern detecting sensor has a primary, linear relation with respect to the area of the color line image in the light receiving plane", and the area of the color line image occupying the light receiving plane of the detecting sensor is calculated for each patch of a two-color superposed pattern. Then, simulation calculation such that the calculated area value is designated as the output value of each patch is performed by preparing the error conditions as follows.

A detection error of misalignment is also calculated by calculating an intersection point of two lines, obtained when the area values are plotted corresponding to the "shift amount of a color line image with respect to the reference color (black) on the x-axis".

Figure 9:
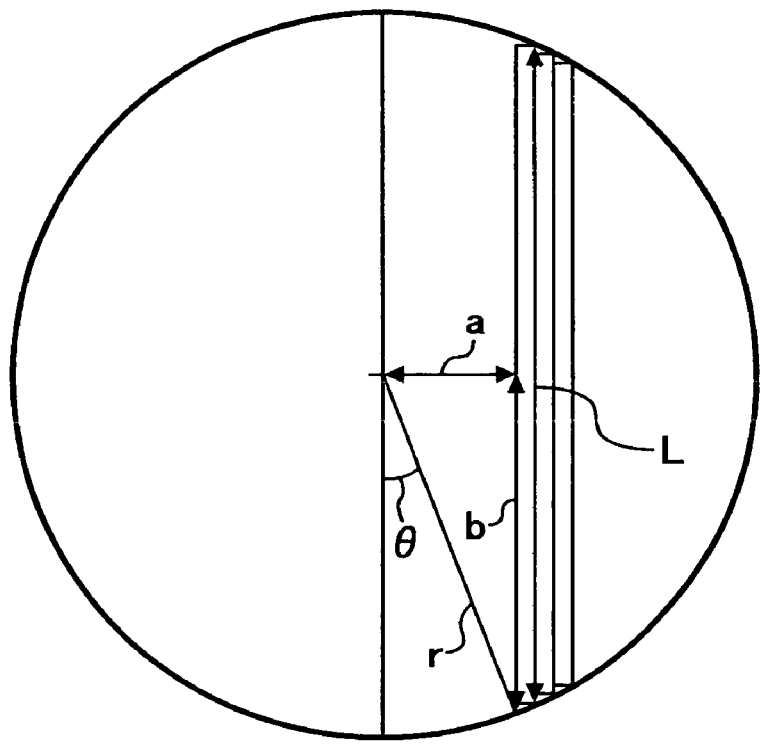
FIG. 9 is a schematic diagram for explaining how to obtain the area of a rectangle in the circular light receiving plane.

Calculation Expression:

As illustrated in FIG. 9, the area S of a rectangle of one section positioned at a distance "a" from the center of the light receiving plane is expressed by a function of the distance "a" from the center of the light receiving plane, such that $S=2\times[a\times\tan(a\cos(a/1.5))]\times(25.4/600)$.

Calculation Condition:
Pattern construction: a repetition of a Bk line and a color line is designated as one patch, and a plurality of patches, each in which the color line is shifted by an arbitrary amount with respect to the Bk line, are continuously formed.
Light receiving diameter of the sensor: diameter=3.0 mm Error Factor and Reference:
Line width (Bk, Color): 3 dots, 6 dots, 12 dots, 18 dots, and 24 dots (calculated by (1 dot=42.3 micrometers (600 dpi)).

One examples of calculation results by the simulation are illustrated in FIGS. 10A, 10B through FIGS. 12A and 12B. The results are obtained based on the condition such that the line width of Bk and a color is 24 dots (=1.016 millimeters) while the light receiving diameter of the sensor is 3 millimeters.

Figure 10A:
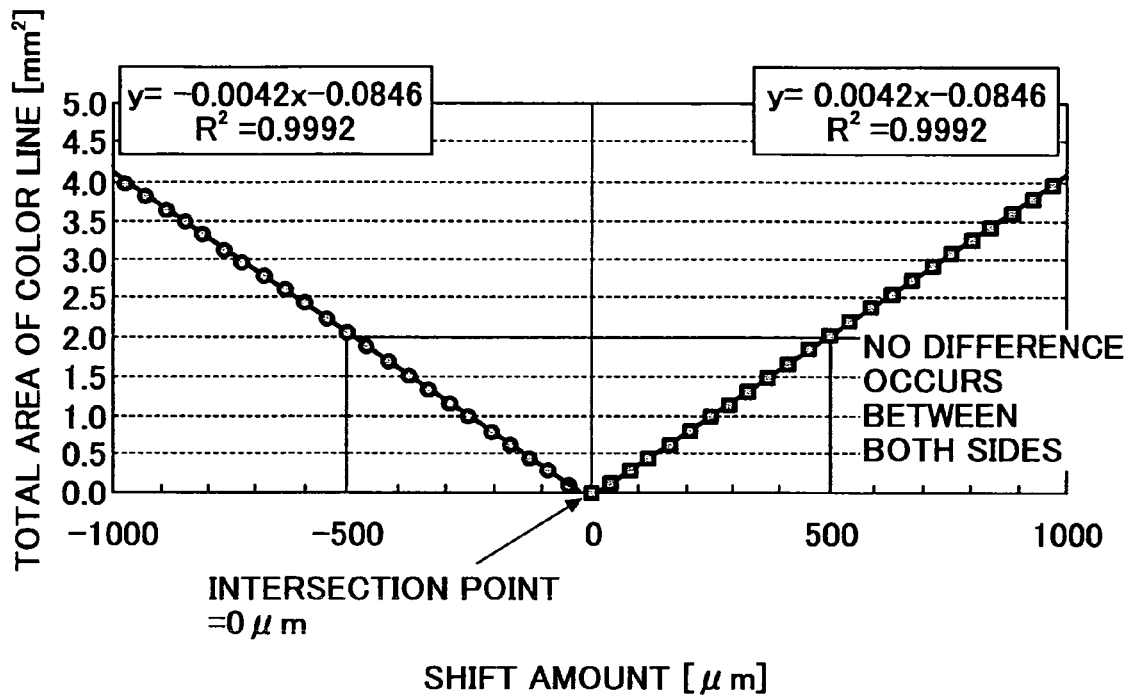
FIG. 10A is a graph of output values of patches obtained by performing simulation of the area of a color line image occupied in the light receiving plane with a condition shown in FIG. 10B.
Figure 10B:
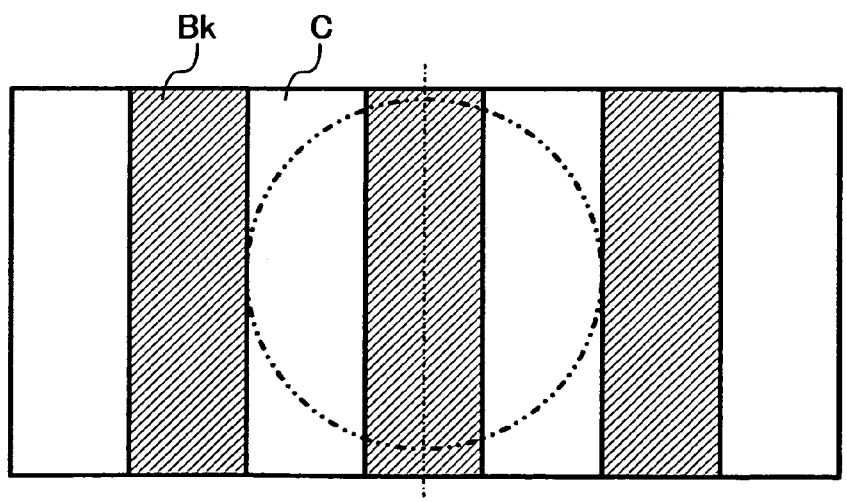
FIG. 10B is a schematic diagram of a positional relation between the center of the Bk line and the center of the light receiving plane (with both centers matched)
Figure 11A:
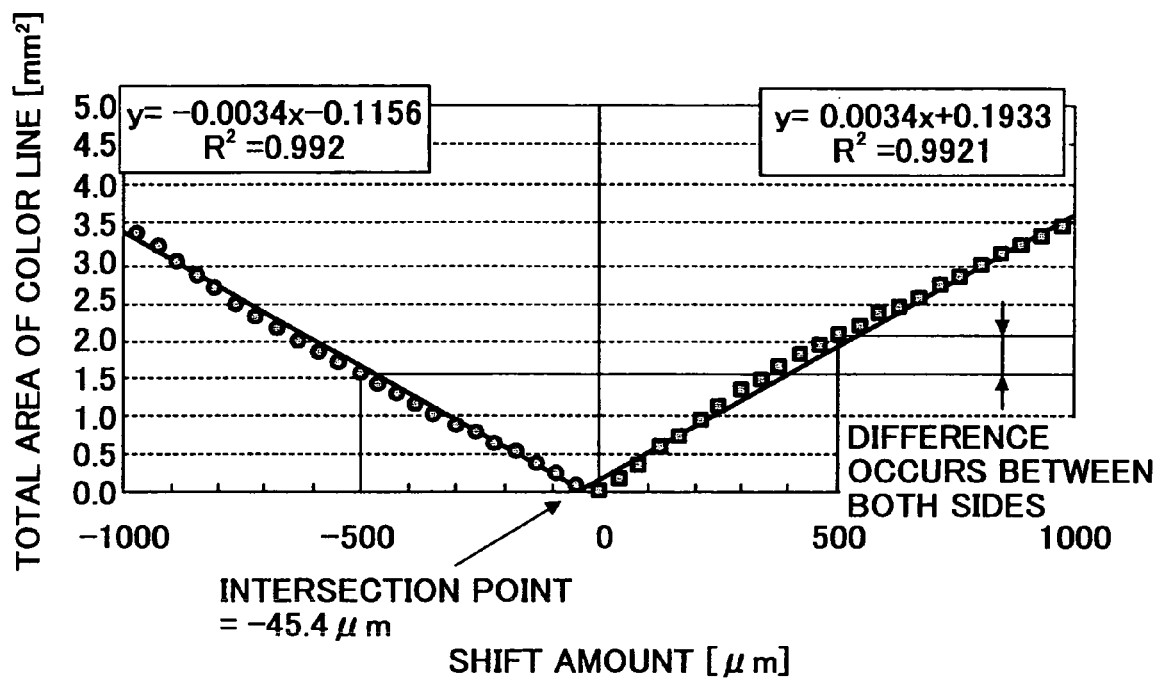
FIG. 11A is a graph of output values of patches obtained by performing simulation of the area of a color line image occupied in the light receiving plane with a condition shown in FIG. 11B.
Figure 11B:
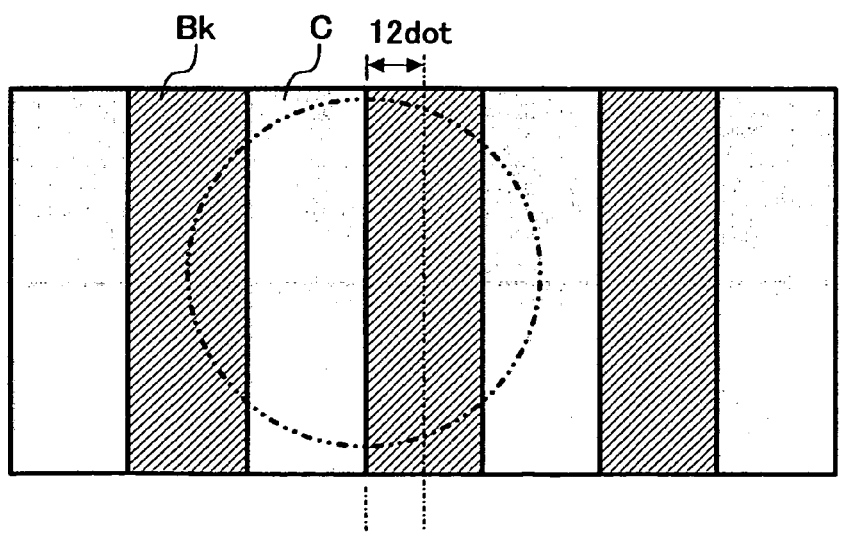
FIG. 11B is a schematic diagram of a positional relation between the center of the Bk line and the center of the light receiving plane (with both centers mismatched by 12 dots)

FIG. 10A illustrates the result of the case where the center of the Bk line coincides with the center of the light receiving plane of the sensor. FIG. 10B illustrates the positional relation between the two. FIG. 11A illustrates the result of the case where the center of the Bk line is shifted from the center of the light receiving plane of the sensor by 12 dots. FIG. 11B illustrates the positional relation between the two.

Figure 12A:
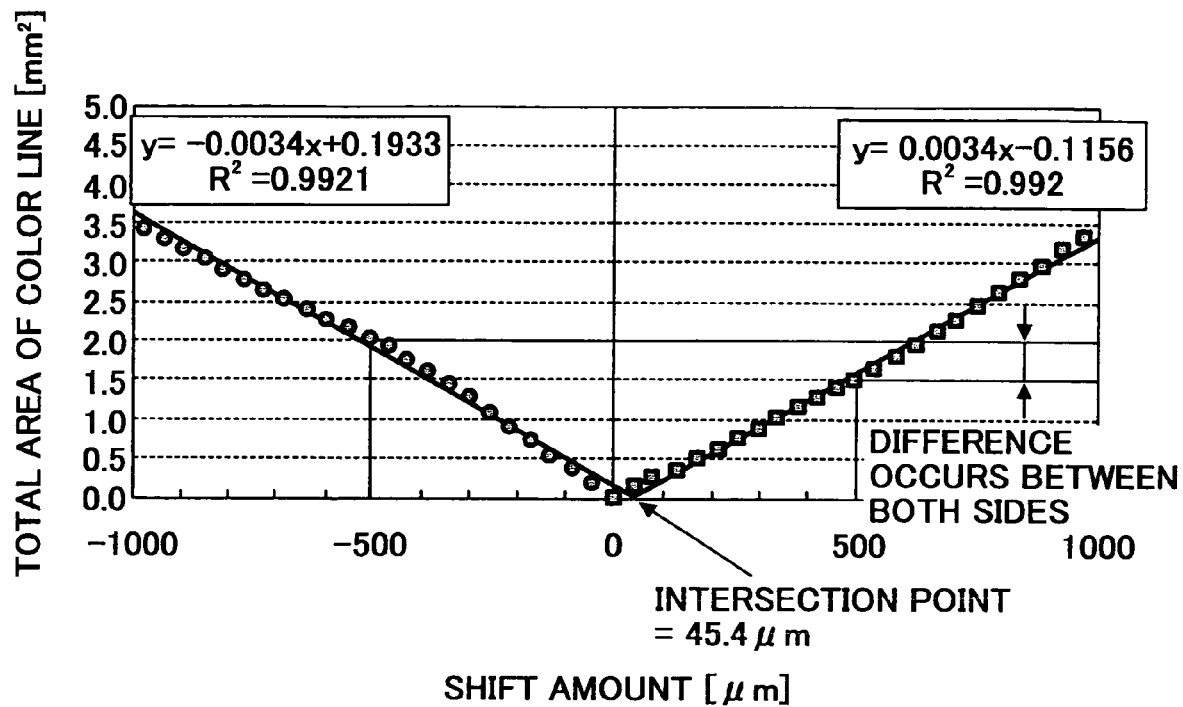
FIG. 12A is a graph of output values of patches obtained by performing simulation of the area of a color line image occupied in the light receiving plane (with a condition shown in FIG. 12B)
Figure 12B:
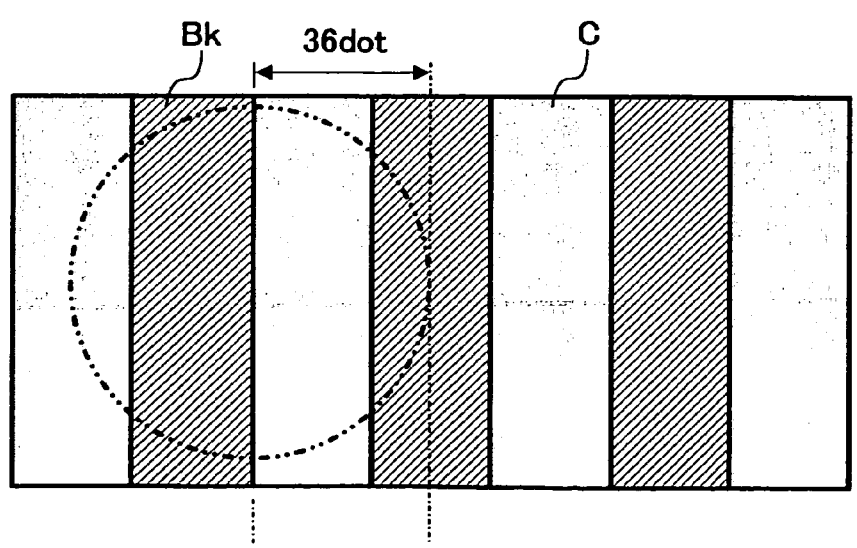
FIG. 12B is a schematic diagram of a positional relation between the center of the Bk line and the center of the light receiving plane (with both centers mismatched by 36 dots)

FIG. 12A illustrates the result of the case where the center of the Bk line is shifted from the center of the light receiving plane of the sensor by 36 dots. FIG. 12B illustrates the positional relation between the two. All the positional relations are based on the patch 1 in FIG. 2.

The same calculation of the intersection point was also conducted for the line width: 3 dots, 6 dots, 12 dots, and 18 dots. The results of the calculations are given to FIG. 13. The x-axis of FIG. 13 indicates "shift quantities of the center of the Bk line with respect to the center of the light receiving plane" taken up as the error factor, and the y-axis indicates the results of calculating the intersection point.

It is obvious from the results that the detection error becomes larger as the line width is increased.

Figure 13:
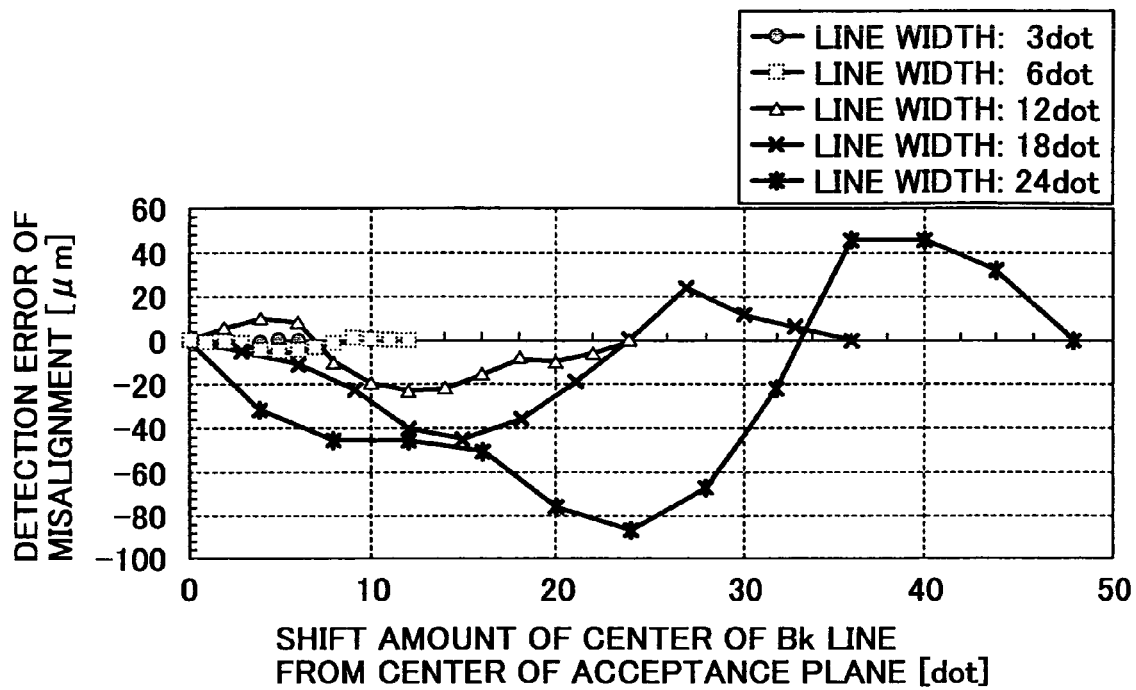
FIG. 13 is a graph of a detection error with respect to a deviation of the center of the Bk line from the center of the light receiving plane.
Figure 14:
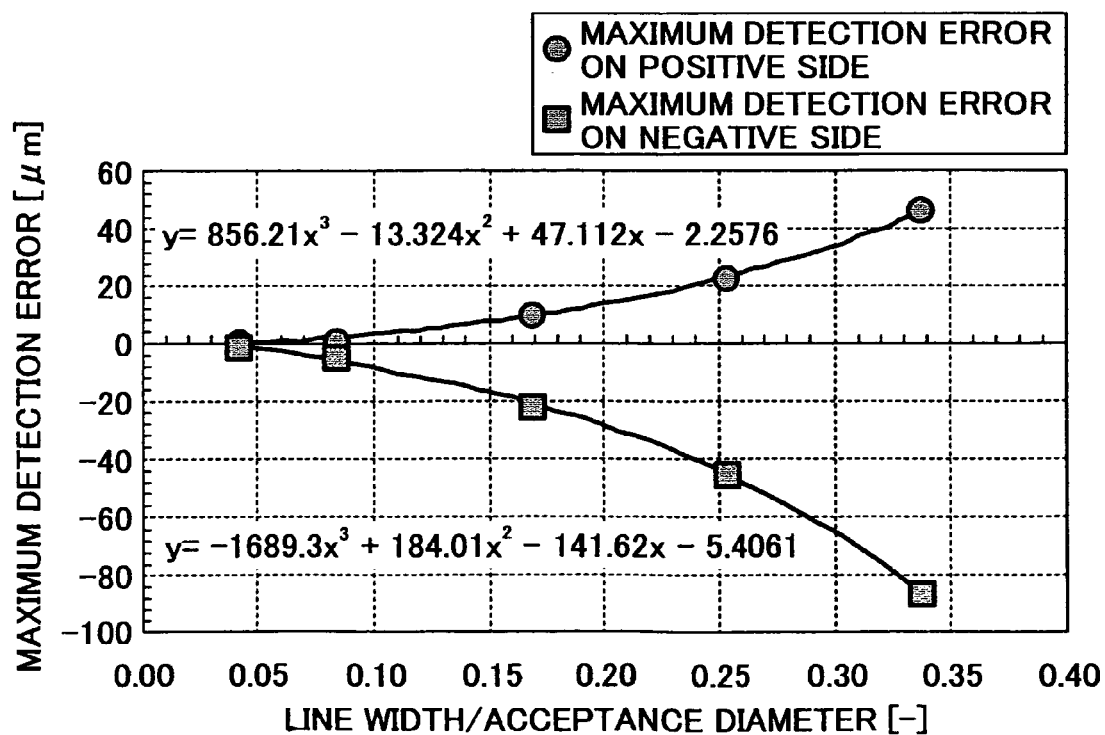
FIG. 14 is a graph of a detection error with respect to a line width-to-light receiving diameter ratio.

However, the results of FIG. 13 are obtained under the condition that the acceptance width (=light receiving diameter) is fixed to 3 millimeters. Therefore, as illustrated in FIG. 14, a ratio between the line width and the acceptance width is plotted on the x-axis. The maximum detection error on the positive side and the maximum detection error on the negative side each shown in FIG. 13 are plotted on the y-axis.

Figure 15:
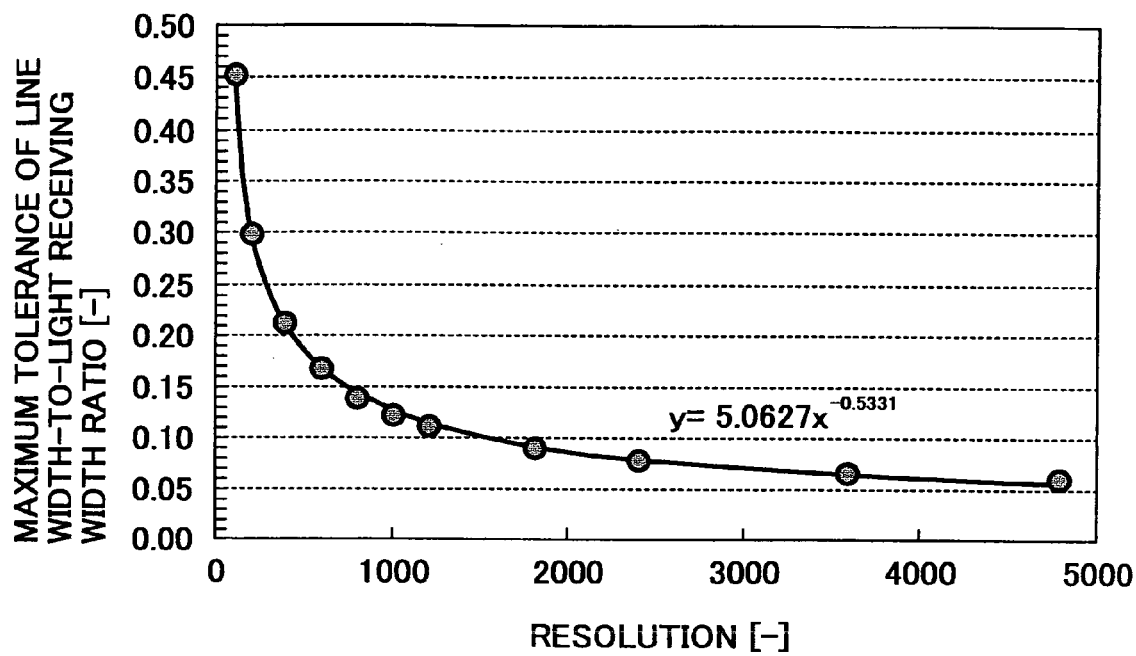
FIG. 15 is a graph of a relation between resolution and a maximum tolerance of the line width-to-acceptance width ratio.

As explained above, the maximum tolerance of the detection error is determined depending on resolution (=writing density). Therefore, as shown in FIG. 15, the resolution is plotted on the x-axis, and the "line width-to-acceptance width ratio" of each resolution obtained from the maximum detection errors on the y-axis of FIG. 14 is plotted on the y-axis (Maximum tolerance of detection error=±25.4/resolution dpi×1000/2 [μm]).

It is obvious from the graph of FIG. 15 that the line width-to-acceptance width ratio has to satisfy the relation, as follows, with respect to the writing density (=resolution) of the color image forming apparatus.

[Line width/acceptance width]$<5.0627\times$[writing density(dpi)]$^{-0.5331}$

Based on this relation, because the writing density of the color printer of FIG. 1 is 600 dpi, the following expression is obtained.

[Line width/acceptance width]$<5.0627\times[600(dpi)]^{-0.5331}<0.167$

Here, as the acceptance width is 3 millimeters, the line width is as follows.

[Line width]$<0.167\times3$ [mm]

$<0.501$ [mm]

$<11.8$ [dot]

Figure 40:
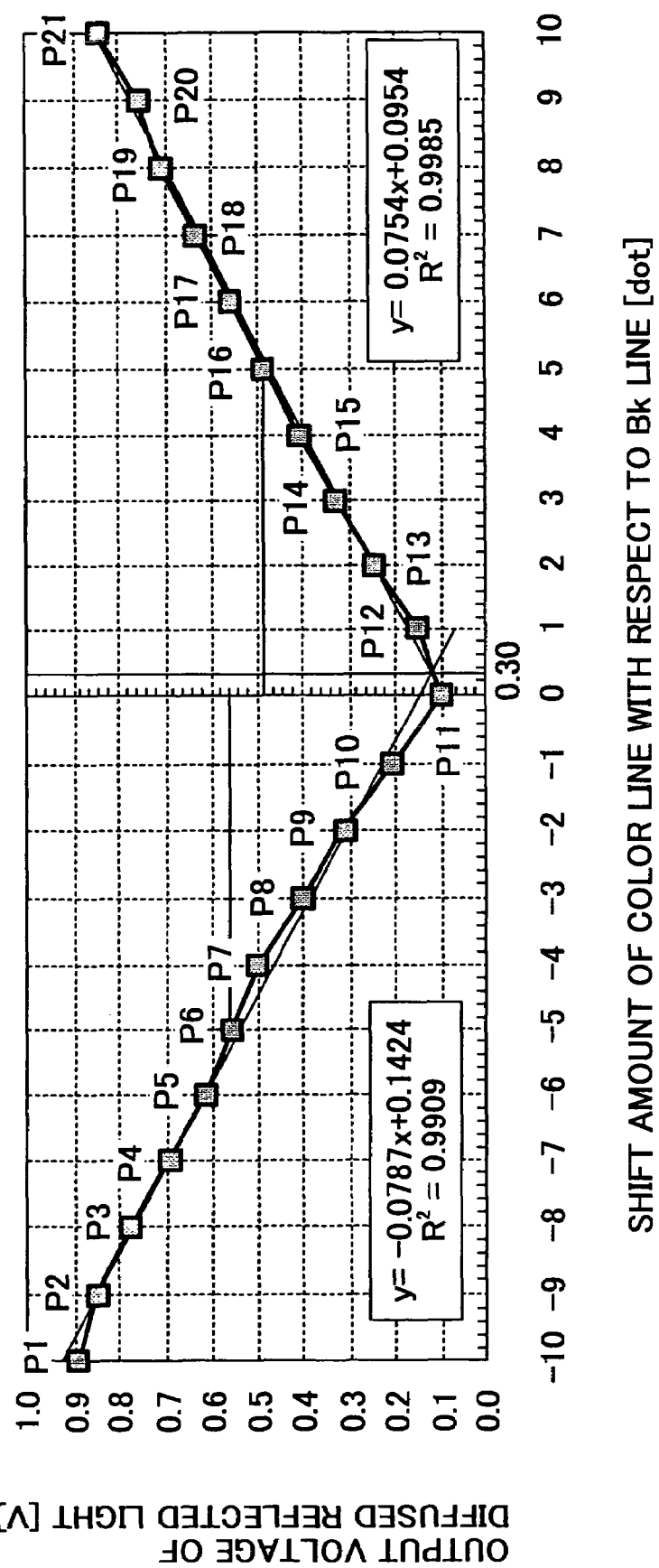
FIG. 40 is a graph of the output voltages of the misalignment pattern with a line width of 10 dots and a calculation result of the intersection point, when the conventional optical sensor is used.

Therefore, the line width has to be set to 11.8 dots or less. Since such a relation between the line width and the acceptance width exists in a relation with the resolution, the calculation result of a positional deviation is 34.74 micrometers, which is the maximum tolerance of detection error or more, in the results of experiments (FIG. 39) conducted by setting the line width to 24 dots. Therefore, it is possible to calculate the positional deviation of 12.91 micrometers, which is the maximum tolerance of detection error or less, in the results of experiments (FIG. 40) conducted by setting the line width to 10 dots that clears the condition of the line width of 11.8 dots or less that satisfies the relation.

In actual cases, however, the line width is determined based on the maximum deviation to be corrected of an apparatus. Therefore, a correct order of determining the line width is as follows. That is, a line width-to-acceptance width ratio is obtained using the expression, a required line width is calculated from the maximum deviation, and a acceptance width is determined based on the line width-to-acceptance width ratio.

The method of calculating the required line width from the maximum deviation to be corrected of the apparatus is explained below.

Figure 16:
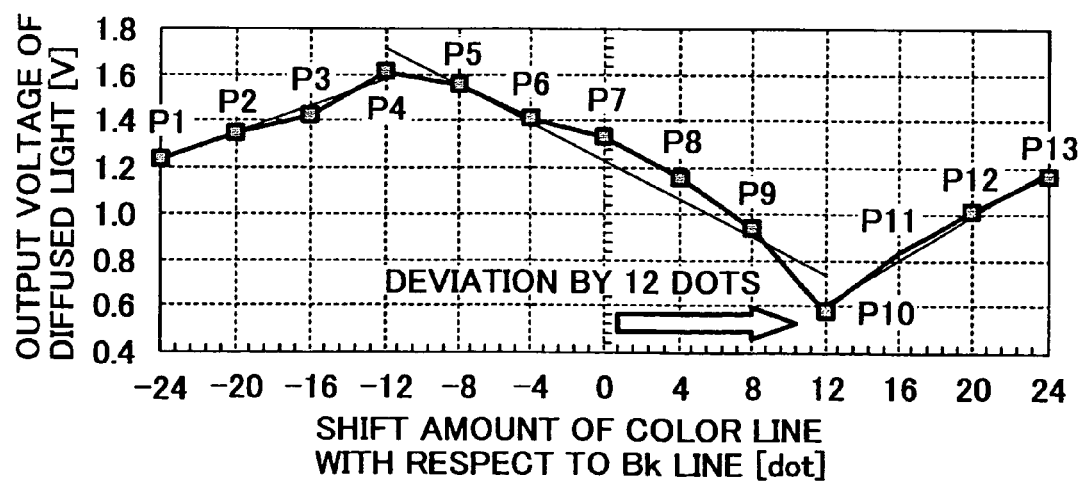
FIG. 16 is a graph of a relation between a shift amount of the color line with respect to the Bk line and an output voltage of diffused light, illustrating the state in which 12 dots are deviated.

In the example of FIG. 39, when an intersection point is to be calculated by the two approximate lines, because a deviation of the central patch is substantially zero, the output voltage of the patch P6 is a minimum value. However, if the deviation in the main scanning direction is about 12 dots, the output is obtained as illustrated in FIG. 16.

Figure 17:
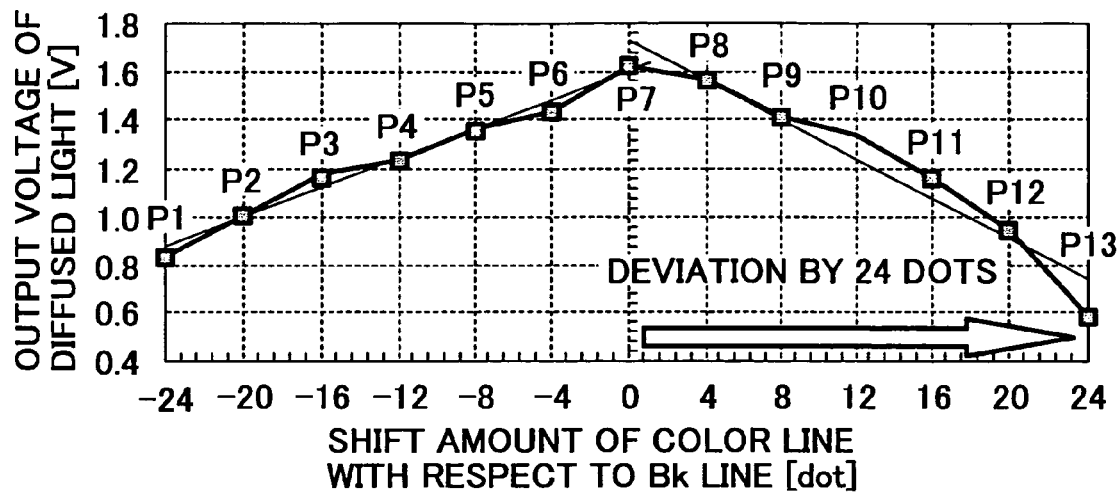
FIG. 17 is a graph of a relation between a shift amount of the color line with respect to the Bk line and an output voltage of diffused light, illustrating the state in which 24 dots are deviated.

In this case, the intersection point can be calculated using points (P4 to P13) covering from the minimum value to the data for the maximum values. However, if the deviation is 24 dots that are twice the above deviation as illustrated in FIG. 17, the calculation of the intersection point becomes impossible.

Therefore, the line width is desirably twice or more of the maximum deviation to be corrected of the machine.

In other words, the expression as follows will be satisfied.

[Line width]>2×[maximum deviation to be corrected]

When the maximum deviation of the apparatus is 5 dots, the following expressions are obtained based on the expression.

[Line width]>2×[maximum deviation to be corrected]

>2×5 [dot]

>10 [dot]

If the line width is calculated based on 1 dot=42.3 micrometers (600 dpi), then the line width becomes 423 micrometers or more. The line width-to-acceptance width ratio in the case of 600 dpi is as follows.

[Line width/acceptance width]<5.0627×[600(dpi)]$^{-0.5331}$

<0.167

Therefore, the acceptance width must be the value as follows.

[Acceptance width]>0.423 [mm]/0.167

>2.53 millimeters or more

Conversely, by setting so, it is possible to suppress a misalignment error to the maximum tolerance or less.

In the examination for far, when the two-color superposed pattern is detected by the alignment pattern detecting sensor, it has been logically studied what basis is effective for setting the line width of the alignment pattern and the acceptance width (or light receiving diameter) with respect to the writing density of the image forming apparatus and the maximum deviation to be corrected of the image forming apparatus.

However, even when the condition is set after the careful study, the detection error in misalignment becomes sometimes larger as a result obtained through actually conducted experiment. The result of the experiment is illustrated in FIG. 18.

Figure 18:
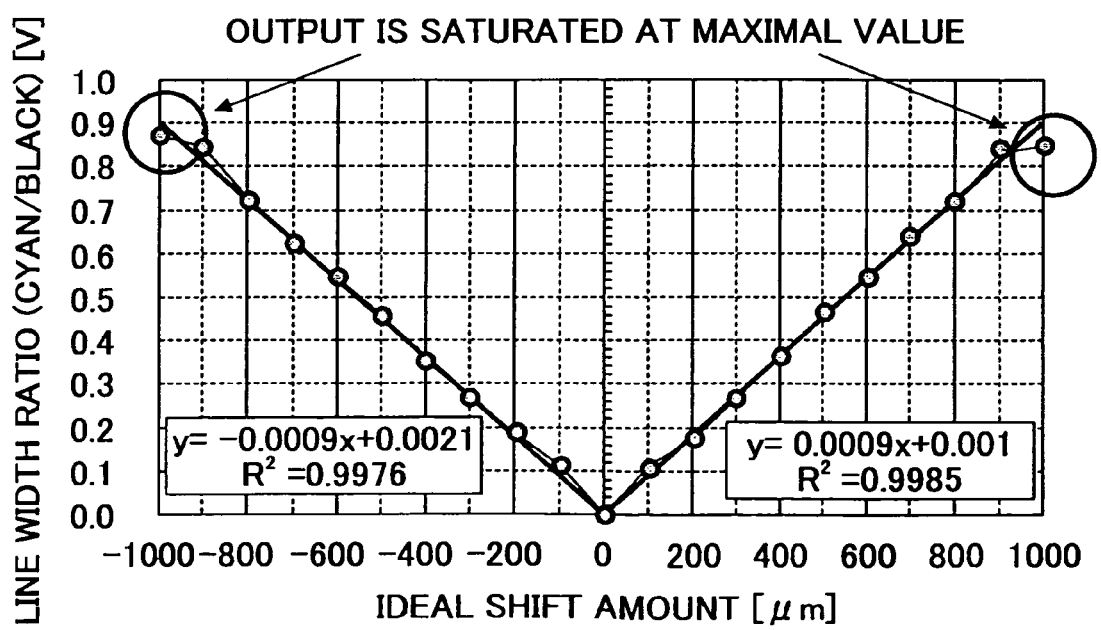
FIG. 18 is a graph of the result of measuring a deviation of the alignment pattern on the transfer belt.

The graph in FIG. 18 is obtained by the following manner. That is, an alignment pattern is formed with 21 patches on the transfer belt 18. Each of the patches is formed with the Bk line and the color line superposed on each other as illustrated in FIG. 2 in such a manner that the line width of each color is set to 1000 micrometers and the color line is shifted by 100 micrometers with respect to the Bk line. The line width ratio between cyan (C) and Bk of the respective patches is measured by a digital microscope equipped with a 2,000,000-pixel CCD, and is plotted on the y-axis with respect to the "arbitrary shift amount of the color line on the x-axis".

It is seen that a change rate in the line width ratio with respect to the "arbitrary shift amount of the color line on the x-axis" decreases near the maximal value.

Figure 19:
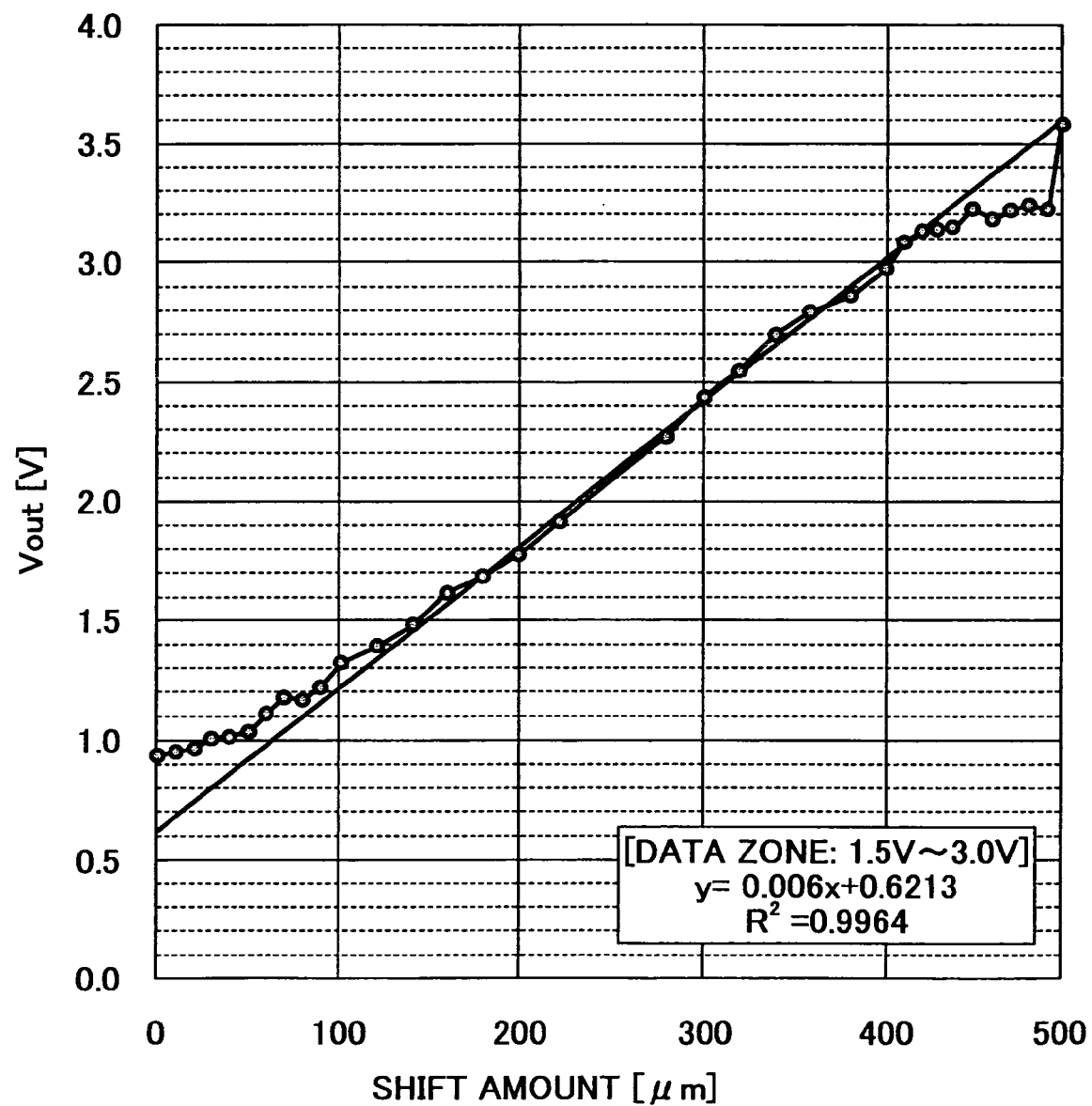
FIG. 19 is a graph of the result of measuring a deviation of the alignment pattern on the transfer belt by the sensor.

FIG. 19 is a graph illustrating the relation between the shift amount on the x-axis and the sensor output voltage on the y-axis, when the line width of the respective colors is set to 500 micrometers and each patch in which the color line is shifted by 10 micrometers with respect to the Bk line is detected by the sensor. From this figure, it is also seen that the linearity deteriorates near the maximal value and near the minimal value.

These are studied because the output voltage actually measured by the alignment pattern detecting sensor 40 of FIG. 3 indicates such a result that the output is saturated near the maximal value. It is confirmed from the experiment that the output is saturated in the same manner in the actual patch, as illustrated in FIG. 18 and FIG. 19.

Therefore, the saturation phenomenon in the output near the maximal value is caused not by the sensor, but by the image forming apparatus that forms the pattern.

As a reason why such a result is obtained, it is confirmed through observation by a digital microscope that it is because thickening occurs both in the Bk line and the C line with respect to an ideal line width of 1000 micrometers.

The cause of such a phenomenon includes influence of the toner density or the like. This phenomenon becomes noticeable particularly in the case of using a two-component type developing device in which the line edge effect is likely to occur.

Figure 20A:
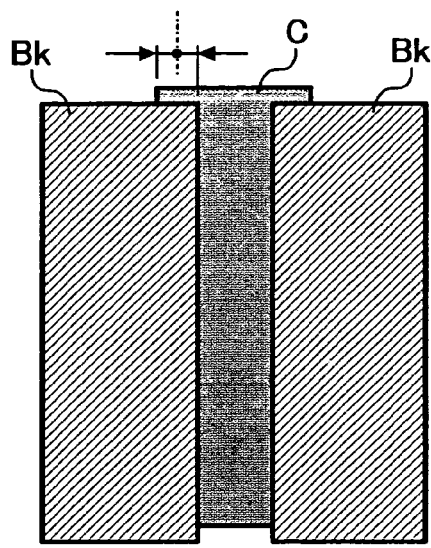
FIG. 20A and FIG. 20B are schematic diagrams for explaining a state in which line thickening occurs in both the Bk line and the C line.
Figure 20B:
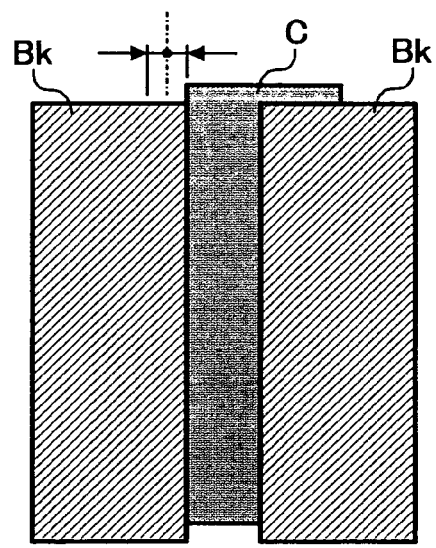

In this result, as illustrated in FIG. 20A and FIG. 20B, since both the Bk line and the C line are thickened, saturation in the output has appeared only on the maximal value side. When both of the lines are thickened, even if the C line is shifted from the state of patch A shown in FIG. 20A to the state of patch B shown in FIG. 20B, no change occurs in the C line between the Bk lines, and the output becomes the same, which is impossible to detect the shift.

Based on this experimental rule, if the toner density of the Bk line is very high, and consequently, only the Bk line is thickened, or on the contrary, if the toner density of the color line is very low and a line having a line width faithful to the latent image, it is presumed that a similar output saturation will occur near the minimal value.

Figure 21A:
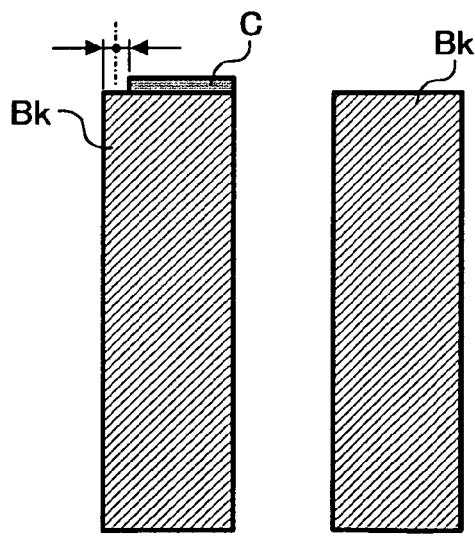
FIG. 21A and FIG. 21B are schematic diagrams for explaining a state in which line thickening occurs only in the Bk line.
Figure 21B:
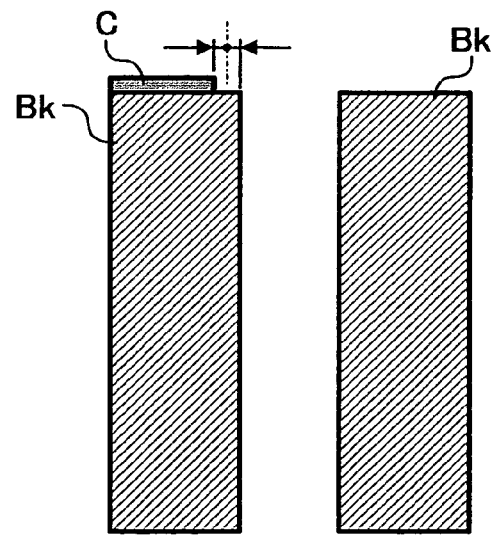

In other words, as illustrated in FIG. 21A and FIG. 21B, even if the C line is shifted from the state of patch A shown in FIG. 21A to the state of patch B shown in FIG. 21B, the shift of the C line occurs within the range of the Bk line, and therefore, no change occurs and the output becomes the same, which is impossible to detect the shift.

Therefore, as for the data points used for determining the approximate line, it is desired to exclude the maximal value and the minimal value or the data near the values, in order to eliminate the influence by the peculiar characteristic to the image forming apparatus as much as possible. Specifically, only the data of (maximum value+minimum value)/2±(maximum value−minimum value)×0.4 is used for calculation, for example, from the maximum value and the minimum value in the output from a plurality of patches.

In the conventional technology, two approximate lines are obtained by the data for all the points of continuous patches, and the intersection point is calculated to obtain a deviation. Therefore, the saturation phenomenon in output occurring near the intersection point has not been discussed.

Therefore, in the conventional technology, the determination coefficient $R^2$ of the two approximate expressions may deteriorate due to the saturation phenomenon in the output occurring near the extreme values. Consequently, an error may occur in the misalignment obtained by the calculation of the intersection point.

In this embodiment, a belt made of polyimide having a lightness L* (JISZ8729) of 1.7 is used for the transfer belt 18, on which the alignment pattern Pm is formed. The reason why the configuration including this is used is explained in more detail below.

Figure 22:
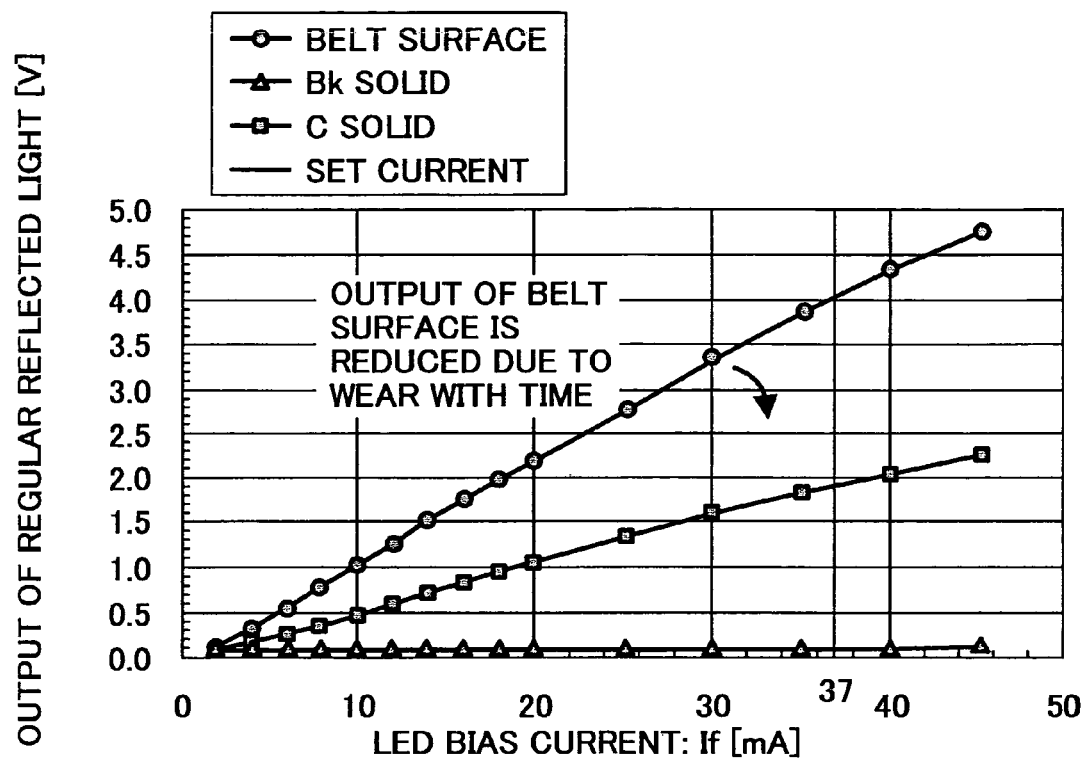
FIG. 22 is a graph of a relation between LED light emission current and output of regular reflected light.

FIG. 22 is a graph plotting the output voltages of the regular reflected light of the belt ground portion, the Bk solid patch portion, and C patch portion, from the alignment pattern detecting sensor 40 as illustrated in FIG. 3A and FIG. 3B, with respect to the LED current on the x-axis.

For example, when the output voltage of the respective patch portions at the time of setting the LED current (=37 mA), in which the output voltage of the ground portion of the transfer belt becomes 4.0 volts, is observed, the result as shown in Table 1 is obtained.

TABLE 1

Output of regular reflected light (IF = 37 mA)

| LED current [mA] | Output voltage of regular reflected light [v] | | |
|---|---|---|---|
| | Belt surface | Bk solid | Cyan solid |
| 37 | 4.00 | 0.12 | 1.91 |

When the alignment pattern in FIG. 22 is to be read by the output of the regular reflected light, the area ratio of P1 and P13 is black line×50%+color portion line×50%, and the area ratio of P7 is black line×50%+color line×50%. Thus, the sensor output of the respective patch portions becomes substantially as follows.

Case where "Bk line group" is formed over "color line group":

The output voltage of P1 and P13=0.12(Bk solid)×0.5+1.91(C solid)×0.5=1.015 volts.

The output voltage of P7=0.12(Bk solid)×0.5+4.0(belt portion)×0.5=2.06 volts.

Figure 23:
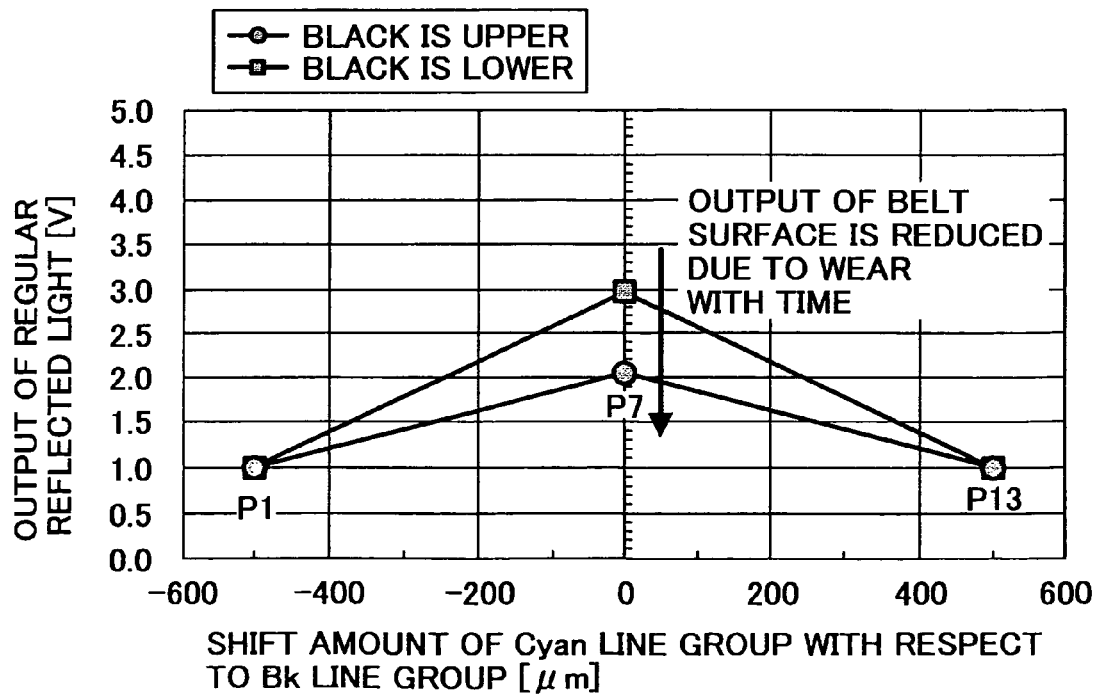
FIG. 23 is a graph of the output of the misalignment pattern when detection is performed by regular reflected light.

Case where "Bk line group" is formed under "color line group":

Each output voltage of the patches is plotted with respect to "arbitrary shift amount of the color line on the x-axis", the results are as illustrated in FIG. 23. From FIG. 23, the followings are found. Case where detection is performed by regular reflected light:

(a) The output voltage becomes the largest in the patch (P7) where the two color lines are perfectly superposed on each other, and the output voltage of the patch is determined substantially by the output from the belt ground portion.

(b) The output difference between the minimum value (P1, P13) and the maximum value (P7) decreases when the "black line group" is over the "color line group", as compared with when "black line group" is under the "color line group".

As explained above, the output of the maximal value (P7), when the patch is detected by the regular reflected light, is determined by the output (∝glossiness) from the belt ground portion. Therefore, (c) if glossiness on a portion of the belt decreases due to its wear with time, a partial defect, or the like, the output of that portion decreases. In other words, if deterioration of the belt by wear with time does not allow detection of the output of that portion, then it is time to replace the belt.

That is, the output voltage of the regular reflected light of the patch portion, to which the belt surface is partially exposed as in P2 to P12 shown in FIG. 2, is likely to be affected by noise of the surface profile characteristic expressed by the glossiness of the belt or the surface roughness Rz. Therefore, for example, if there is a defect in the ground portion of P6 patch, the output of P6 is different from the output of P8 as mirror image with respect to P6. Therefore, the position of intersection point determined by calculation results in deviation from the actual point.

On the other hand, when detection is performed by diffused light, the positional deviation is detected with being hardly affected by the surface roughness of the transfer belt 18.

Figure 24:
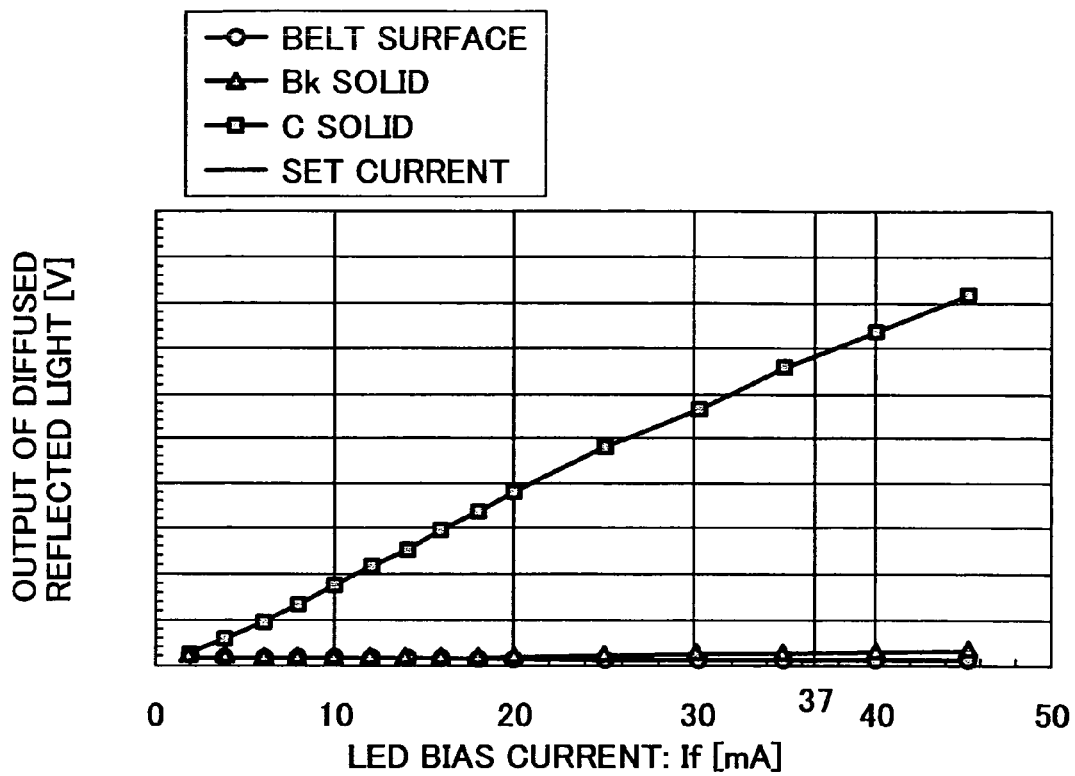
FIG. 24 is a graph of a relation between LED light emission current and output of diffused light.

FIG. 24 is a graph plotting the output voltages of the diffused light of the belt ground portion, the Bk solid portion, and the C solid portion, from the alignment pattern detecting sensor 40 of FIG. 3A and FIG. 3B, with respect to the LED current on the x-axis.

Figure 26:
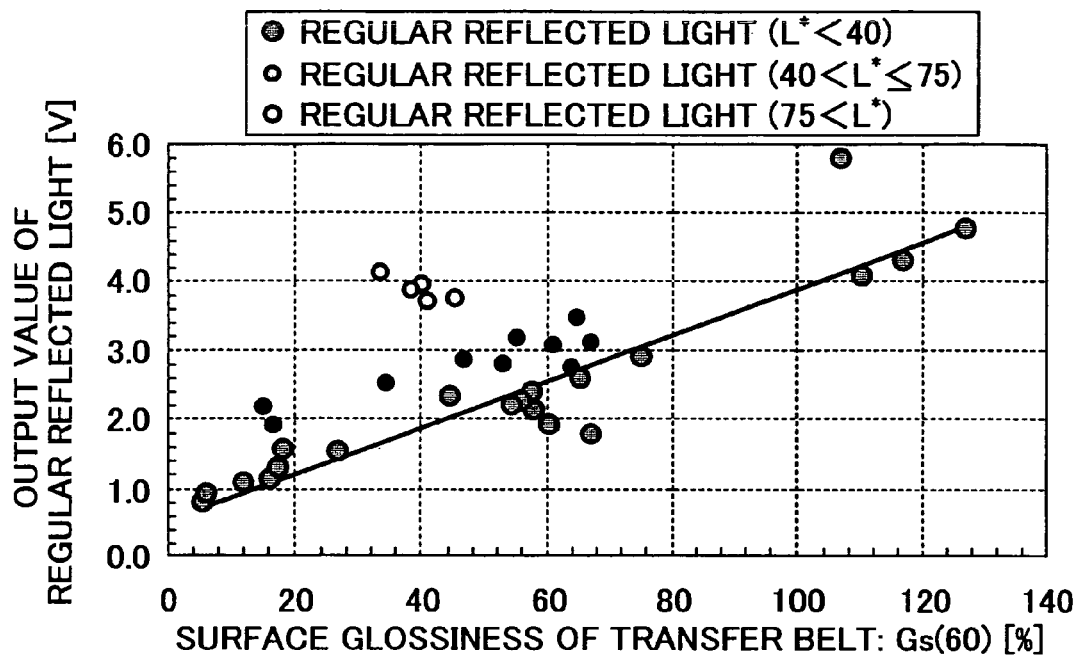
FIG. 26 is a graph of a relation between glossiness on the surface of the transfer belt and the sensor output.
Figure 27:
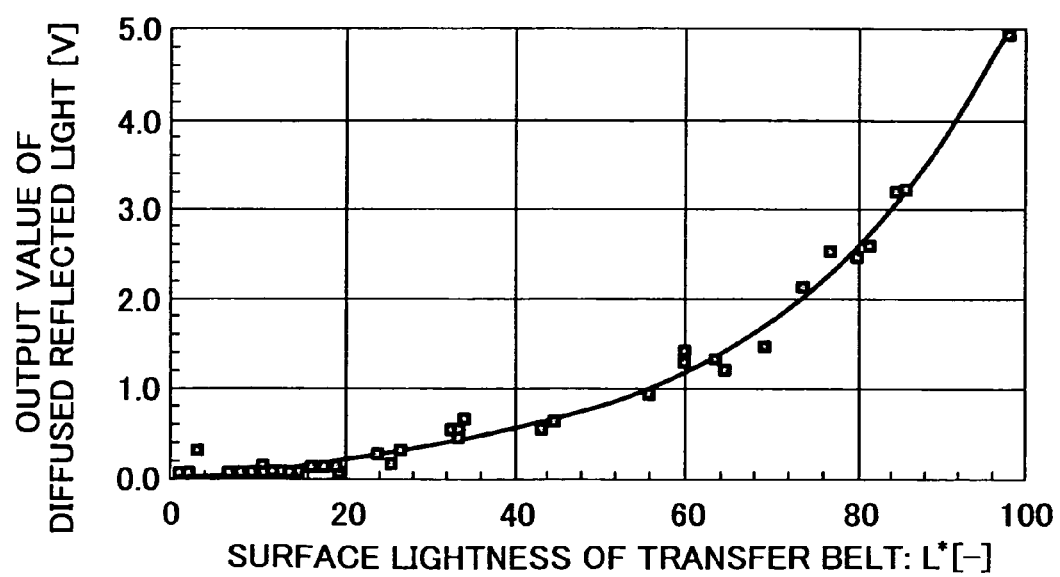
FIG. 27 is a graph of a relation between lightness on the surface of the transfer belt and the output of diffused light.

As illustrated in FIG. 26, the output of the regular reflected light has high correlation with the glossiness of an object to be detected (the transfer belt 18 on which the alignment pattern is formed), whereas the output of the diffused light has high correlation with the lightness L* of the object, and has no correlation with the glossiness, as illustrated in FIG. 27. Therefore, the transfer belt 18 having L* of 1.7 equipped in the color printer in this embodiment has substantially the same output characteristic as that of the black toner. As is obvious from FIG. 27, the linearity is obtained up to lightness L* of about 40, and the linearity is very high up to lightness L* of 20.

Two cases are considered herein like the previous case, and the result as shown in Table 2 is obtained for the output voltage in each portion.

TABLE 2

Output of diffused light (IF = 37 mA)

| LED current [mA] | Output voltage of diffused light [v] | | |
|---|---|---|---|
| | Belt surface | Bk solid | Cyan solid |
| 37 | 0.07 | 0.16 | 3.42 |

Case where "Bk line group" is formed over "color line group":

The output voltage of P1 and P13=0.16(Bk solid)×0.5+3.42(C solid)×0.5=1.79 volts.

The output voltage of P7=0.16(Bk solid)×0.5+0.07(belt portion)×0.5=0.115 volt.

Figure 25:
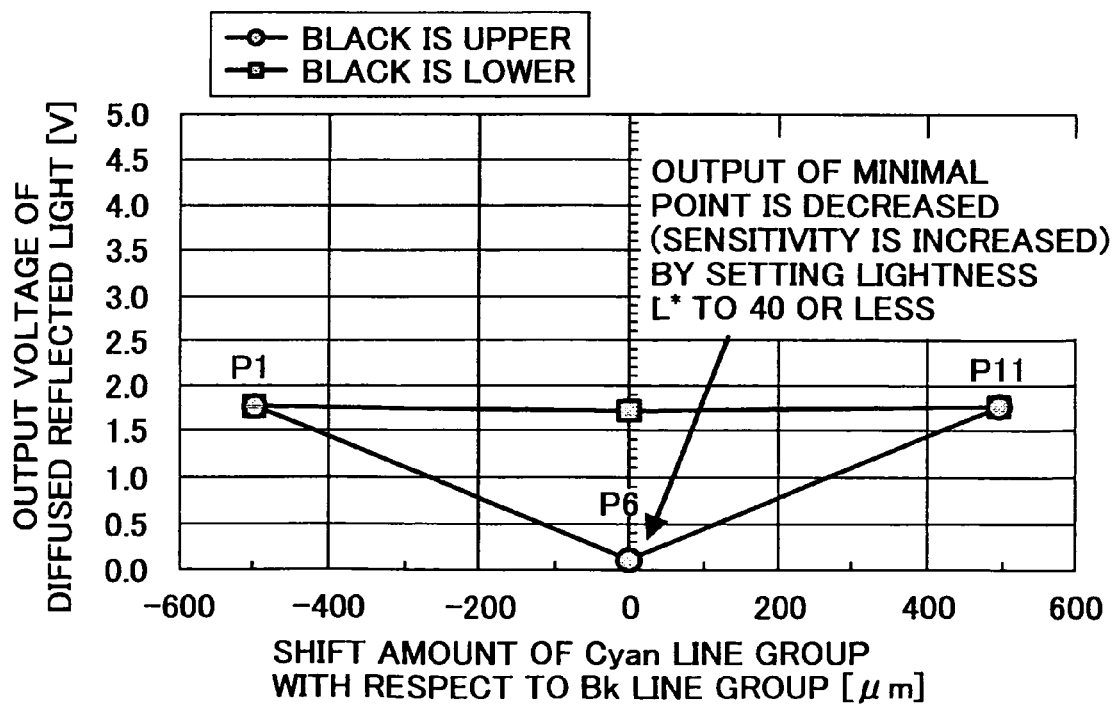
FIG. 25 is a graph of the output of the misalignment pattern, when detection is performed by diffused.

Case Where "Bk Line Group" is Formed Under "Color Line Group":

When the output voltages of the respective patches are plotted with respect to an "arbitrary shift amount of a color line on x-axis", the result as illustrated in FIG. 25 can be obtained. From FIG. 25, the followings are found.

Case Where Detection is Performed by Diffused Light:

(a) The output voltage becomes the smallest in the patch (P7) where the two color lines are perfectly superposed on each other, and the output voltage of the patch is determined by the output voltage of "the color line group".

(b) The output difference between the maximum value (P1, P13) and the minimum value (P7) is increased when the "black line group" is over the "color line group", as compared with when the "black line group" is under the "color line group".

As explained above, the output of the maximum value (P7), when detection is performed by the diffused light, is determined by the output (∝lightness) from the "color line group". Therefore, (c) the output is not affected at all by wear of the belt with time, its partial defect, or the like.

In other words, since detection performance does not depend on the deterioration of the belt, the life of the transfer belt can be prolonged.

It is assumed that an alignment pattern is detected by the alignment pattern detecting sensor. More specifically, the alignment pattern is obtained by designating a plurality of lines, as one patch, in which a line image of black as a reference color and a line image of a color other than the reference color are superposed on each other, and continuously forming patches by shifting a relative positional relation between the line images of the two colors by an arbitrary amount. Based on the assumption, in order to detect the pattern without being affected by time-varying factors such as wear or a partial defect of the transfer belt, the followings are desirable. That is, (1) detection is performed by the output of the diffused light, (2) the imaging order of the black line image, as the reference color, is the last in color superposition on the transfer element, and (3) the lightness (L*) of the transfer element on which the alignment pattern is formed be not larger than 40, preferably not larger than 20.

The result as shown in FIG. 26 is obtained by plotting output values of regular reflected light when the LED current If is fixed to 20 mA with respect to glossiness of 60 degrees on the surface of the transfer belt on the x-axis, for 42 types of transfer belts having different glossiness and lightness. The measured values of glossiness shown in this figure are values obtained by measuring the glossiness, using a gloss meter PG-1 manufactured by Nippon Denshoku Industries Co. Ltd., under the condition of measurement angle of 60 degrees.

The result as shown in FIG. 27 is obtained by plotting outputs of diffused light when the LED current is fixed to 20 mA with respect to the lightness L* on the surface of the transfer belt on the x-axis, for the same 42 types of transfer belts as illustrated in FIG. 26. The lightness measured values shown in this figure are values obtained by measuring the lightness, using X-Rite 938 manufactured by X-Rite, Inc., under the conditions of a light source of D50 and a viewing angle of 2 degrees.

Figure 28:
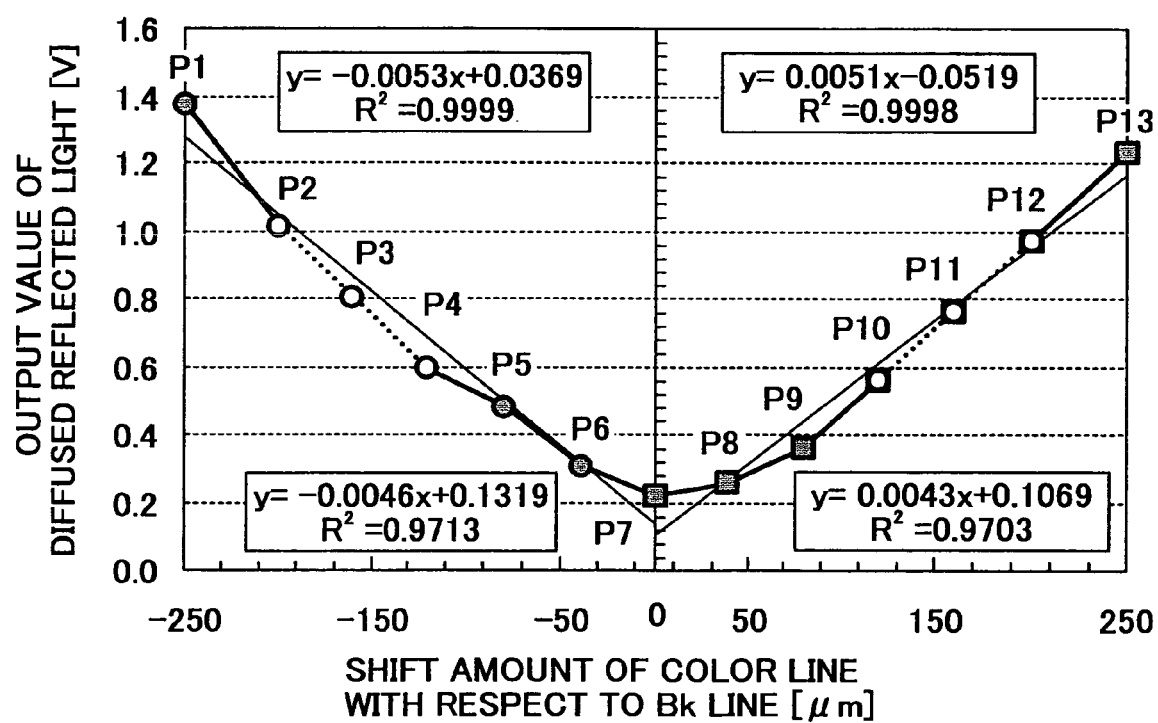
FIG. 28 is a graph of a relation between the shift amount of the color line with respect to the Bk line and an output voltage of diffused light.

Results of experiments conducted for confirming the effect of the method according to the present invention are illustrated in FIG. 28. Sampling of output voltages was performed by 500 sampling/sec with respect to the linear velocity of 125 mm/sec of the image forming apparatus (color printer) of the present invention.

Output voltages of the whole patches, slopes of the two lines obtained from the output voltages, y-intercepts, RSQ (=determination coefficient: $R^2$), and the result of calculation of the intersection point are shown in Table 3.

TABLE 3

Output voltage of whole patches and Result of calculation of intersection point

| | Shift amount | P1-P7 | P7-P13 |
| --- | --- | --- | --- |
| P1 | −250 | 1.3782 | |
| P2 | −200 | 1.0183 | |
| P3 | −160 | 0.8042 | |
| P4 | −120 | 0.5967 | |
| P5 | −80 | 0.4821 | |
| P6 | −40 | 0.3110 | |
| P7 | 0 | 0.2149 | 0.2149 |
| P8 | 40 | | 0.2562 |
| P9 | 80 | | 0.3659 |
| P10 | 120 | | 0.5644 |
| P11 | 160 | | 0.7636 |
| P12 | 200 | | 0.9740 |
| P13 | 250 | | 1.2329 |
| slope | | −0.0046 | 0.0043 |
| y-intercept | | 0.1319 | 0.1069 |
| RSQ | | 0.9713 | 0.9703 |
| intersection point | 2.83 [µm] | | |

As explained above, the results as follows were obtained in the experiments. That is, the positional deviation was 2.83 micrometers with respect to the detection-error maximum value in the positional deviation having the light receiving diameter of 3 millimeters and the line width of 250 micrometers (=about 6-dot line) based on the simulation as illustrated in FIG. 13.

As is clear from the graph of FIG. 28, the outputs of data near the extreme values tend to be saturated.

The result of calculating the intersection point using points excluding the points of the extreme values and data near the extreme values is shown in Table 4.

TABLE 4

Output voltage excluding extreme value and adjacent data and Result of calculation of intersection point

| | Shift amount | P2-P4 | P10-P12 |
| --- | --- | --- | --- |
| P2 | −200 | 1.0183 | |
| P3 | −160 | 0.8042 | |
| P4 | −120 | 0.5967 | |
| P10 | 120 | | 0.5644 |
| P11 | 160 | | 0.7636 |
| P12 | 200 | | 0.9740 |
| slope | | −0.0053 | 0.0051 |
| y-intercept | | −0.0369 | −0.0519 |
| RSQ | | 0.9999 | 0.9998 |
| intersection point | 1.44 [µm] | | |

As explained above, by excluding the data points of the extreme values and near the extreme values from the data points used to calculate a linear approximate expression, the determination coefficient $R^2$ (=RSQ) of an approximate line representing linearity is largely improved from 0.9173 to 0.9999 (P1 to P7) and from 0.9703 to 0.9998 (P7 to P13). As a result, it is confirmed that high-accuracy detection of the positional deviation becomes possible.

In this experiment, the positional deviation of the center patch P7 in the alignment pattern formed on the transfer belt 18 was observed also by the digital microscope equipped with 2,000,000-pixel CCD to confirm the deviation was zero.

Based on the result of the experiment, by setting the width of lines forming each patch of the alignment pattern so as to satisfy a relation as follows, it is possible to set a misalignment detection error due to non-linearity of output to the maximum tolerance or less. The relation of

[acceptance width]>[line width]/(5.0627×[writing density(dpi)]$^{-0.5331}$)

is satisfied in a relation between a acceptance width of the alignment pattern detector and a writing density of an image forming apparatus. More specifically, the image forming apparatus includes an alignment pattern obtained by designating a plurality of lines, as one patch, formed by superposing a line image of black as a reference color and a line image of a color other than the reference color, and continuously forming patches in such a manner that a relative positional relation of the two color line images is shifted by an arbitrary amount. The image forming apparatus also includes an alignment pattern detector that detects the alignment pattern, and a corrector that determines a misalignment between the reference color and the other color and a direction of the misalignment, from output signals of the alignment pattern detector, and corrects the misalignment. Further, the linearity of the two approximate lines used for calculation of the intersection point is improved by excluding the extreme values or data near the extreme values from the data points used for the calculation. As a result, it is possible to decrease the number of data points, i.e., the number of patterns used to calculate the linear approximate expression, up to two points at minimum in each line (up to four patches as a whole).

That is, it becomes possible to largely reduce the processing time for misalignment adjusting operation having nothing to do with the normal printing operation or making no contribution to productivity.

Furthermore, even if such a sensor (the alignment pattern detecting sensor 40 similar to the conventional sensor) is used, high-accuracy detection of the misalignment becomes possible. Thus, sampling using a sampling frequency as low as about 1/100 with respect to the conventional edge detection method is sufficient enough to detect a misalignment.

Figure 5:
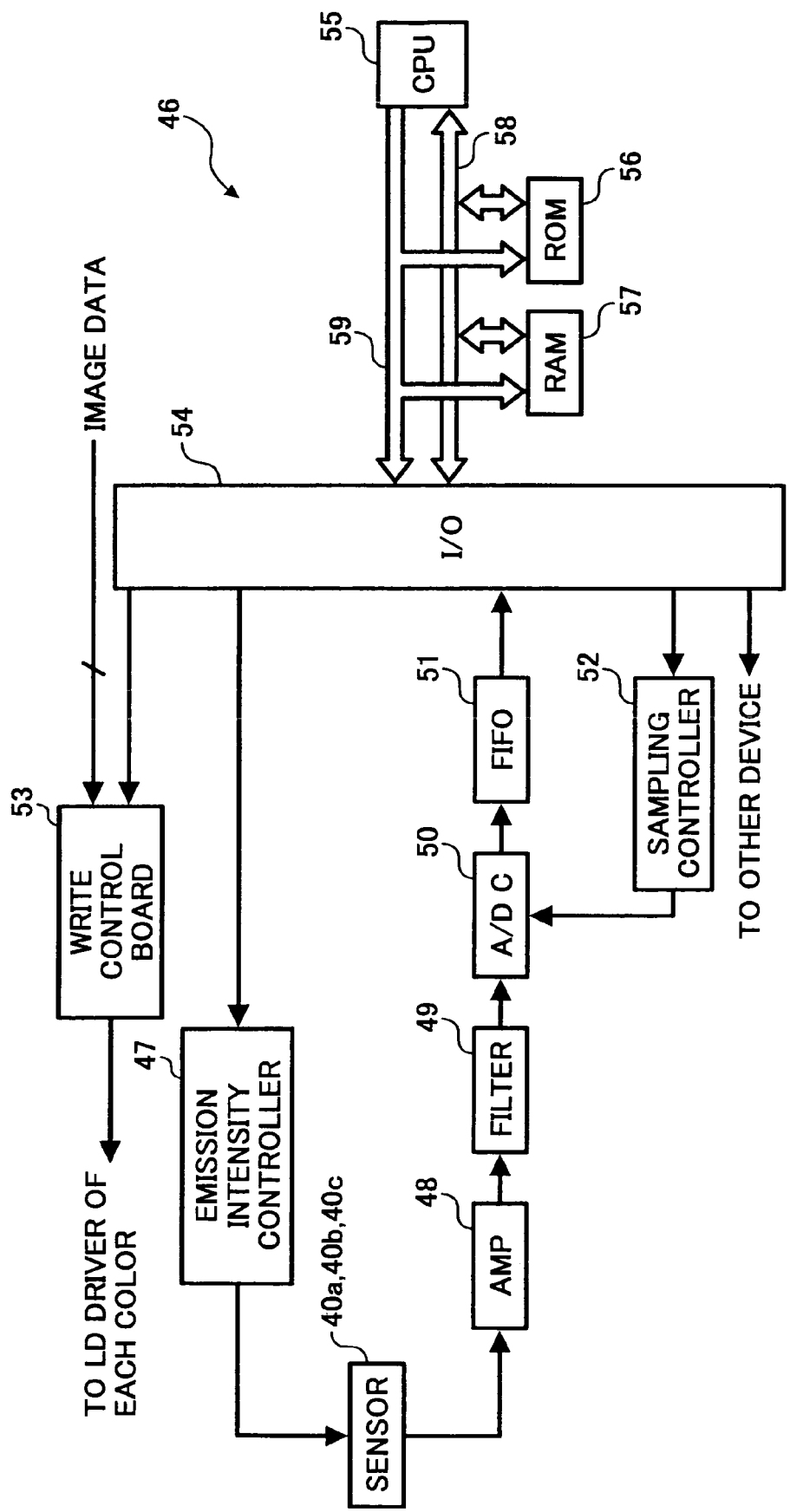
FIG. 5 is a block diagram of a misalignment correcting unit.

The misalignment correction based on the alignment pattern detecting sensor 40 and the method is performed by a misalignment correcting unit. The misalignment correcting unit 46 is explained below with reference to FIG. 5.

A light emitting diode 40A is a light emitter of the alignment pattern detecting sensors 40a, 40b, and 40c. The amount of light emitted from the light emitting diode 40A is controlled by a light emission amount controller 47. A photodiode 40B on an output side is connected to an input-output (I/O) port 54 via an amplifier 48, a filter 49, an analog-to-digital (A/D) converter 50, and a First In First Out (FIFO) memory 51.

The detection signals obtained from the alignment pattern detecting sensors 40a, 40b, and 40c are amplified by the amplifier (AMP) 48 to pass through the filter 49, and are converted from analog data to digital data by the A/D converter 50.

Sampling of data is controlled by a sampling controller 52, and the sampled data is stored in the FIFO memory 51. The sampling controller 52 and a write control board 53 are connected to the I/O port 54.

The I/O port 54, CPU 55, ROM 56, and RAM 57 are connected with each other by a data bus 58 and an address bus 59.

The ROM 56 stores various programs including a program for calculating a misalignment of the alignment pattern Pm. The program for calculating a misalignment of the alignment pattern Pm includes such conditions that the extreme data is excluded from the data points used for the intersection calculation, or the like.

The ROM address, the RAM address, and various input and output equipment are specified by the address bus 59.

The CPU 55 monitors detection signals from the detecting sensors 40a, 40b, and 40c at a predetermined timing. Further, the CPU 55 controls the light emission amount of the light emitting diode 40A by the light emission amount controller 47 so that detection of the alignment pattern Pm is reliably performed even if the light emitting diode 40A of the detecting sensors 40a, 40b, and 40c deteriorates, to thereby make the output level of the light receiving signal from the photodiode 40B constant at all times.

The CPU 55 also performs setting of the write control board 53, based on the correction amount obtained from the detection result of the alignment pattern (including an alignment pattern for detecting a misalignment in the sub-scanning direction, explained later), in order to change an angular frequency based on a change of registration in the main scanning direction and registration in the sub-scanning direction and based on a magnification error.

The write control board 53 includes a device that can set the output frequency very finely, for example, a clock generator or the like using a voltage controlled oscillator (VCO), for each color including the reference color. The write control board 53 uses the output of the clock generator as an image clock. The CPU 55 also controls a stepping motor for skew adjustment (not shown) in the optical write unit 16 based on the correction amount obtained from the detection result of the alignment pattern.

The misalignment correcting unit 46 is comprised of the respective elements excluding the alignment pattern detecting sensors 40a, 40b, and 40c. The main controller in the color printer may serve as the misalignment correcting unit 46.

The misalignment adjusting operation by the misalignment correcting unit 46 is executed when it coincides with any of the following conditions such that (1) power is on, (2) a temperature change in the optical system is not smaller than a predetermined value (for example, 5 degrees), and (3) a print job for the certain number of sheets or more is finished.

In the first embodiment, the alignment pattern for detecting color misalignment in the main scanning direction is explained. However, when color misalignment in the sub-scanning direction (the same direction as an advance direction of the transfer belt 18), an alignment pattern Ps as illustrated in FIG. 29 is formed on the transfer belt 18 in the same mode as that of FIG. 4. Such a mode is explained below as the second embodiment of the present invention.

In the second embodiment, the alignment pattern Ps is obtained in the same manner as the alignment pattern Pm by designating a plurality of lines, as one patch, in which a line image Bk of block as a reference color and a line image C of a color other than the reference color such as cyan are superposed on each other, and continuously forming patches each in such a manner that a relative positional relation between the two color line images is shifted by an arbitrary amount.

Figure 30A:
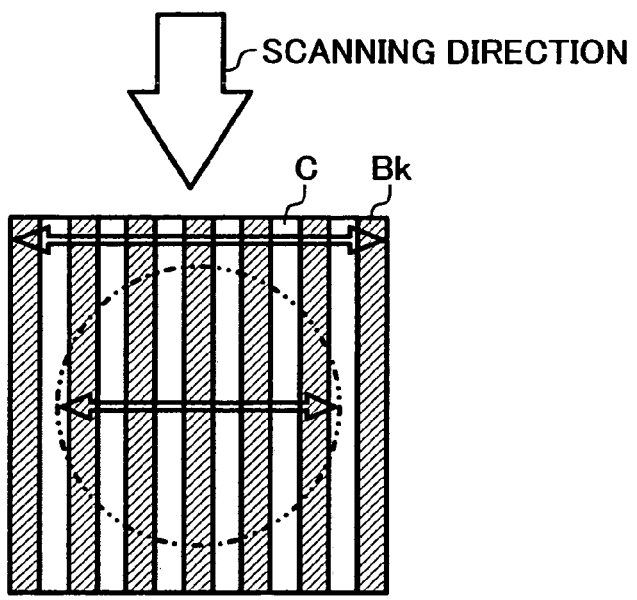
FIG. 30A to FIG. 30C are schematic diagrams for explaining changes in each orientation (angle) of the alignment pattern with respect to the scanning direction.
Figure 30B:
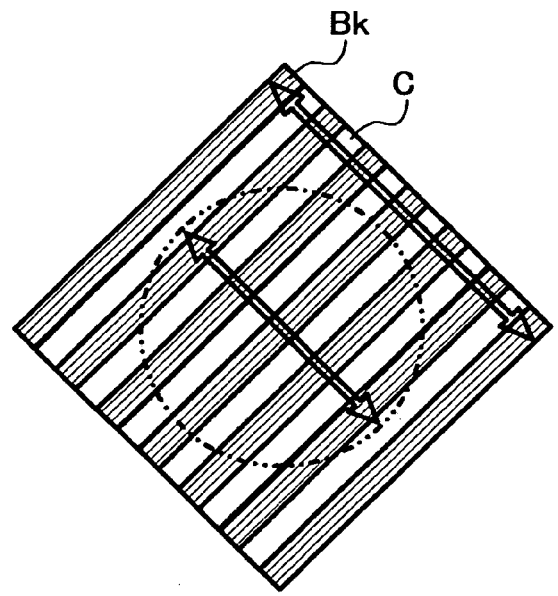
Figure 30C:
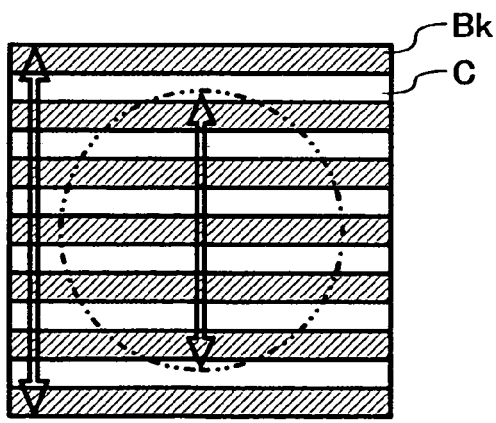

The alignment pattern may be put in any orientation (angle) with respect to the scanning direction as illustrated in FIG. 30. Furthermore, the shape of the light receiving plane of the alignment pattern detecting sensor 40 may be any of a circle, an oval, and a rectangle.

The present invention is effective on the shape of the light receiving plane of a sensor configured to split light into P wave component and S wave component by using a beam splitter and on the arrangement of the sensor in the pattern scanning direction.

Figure 31:
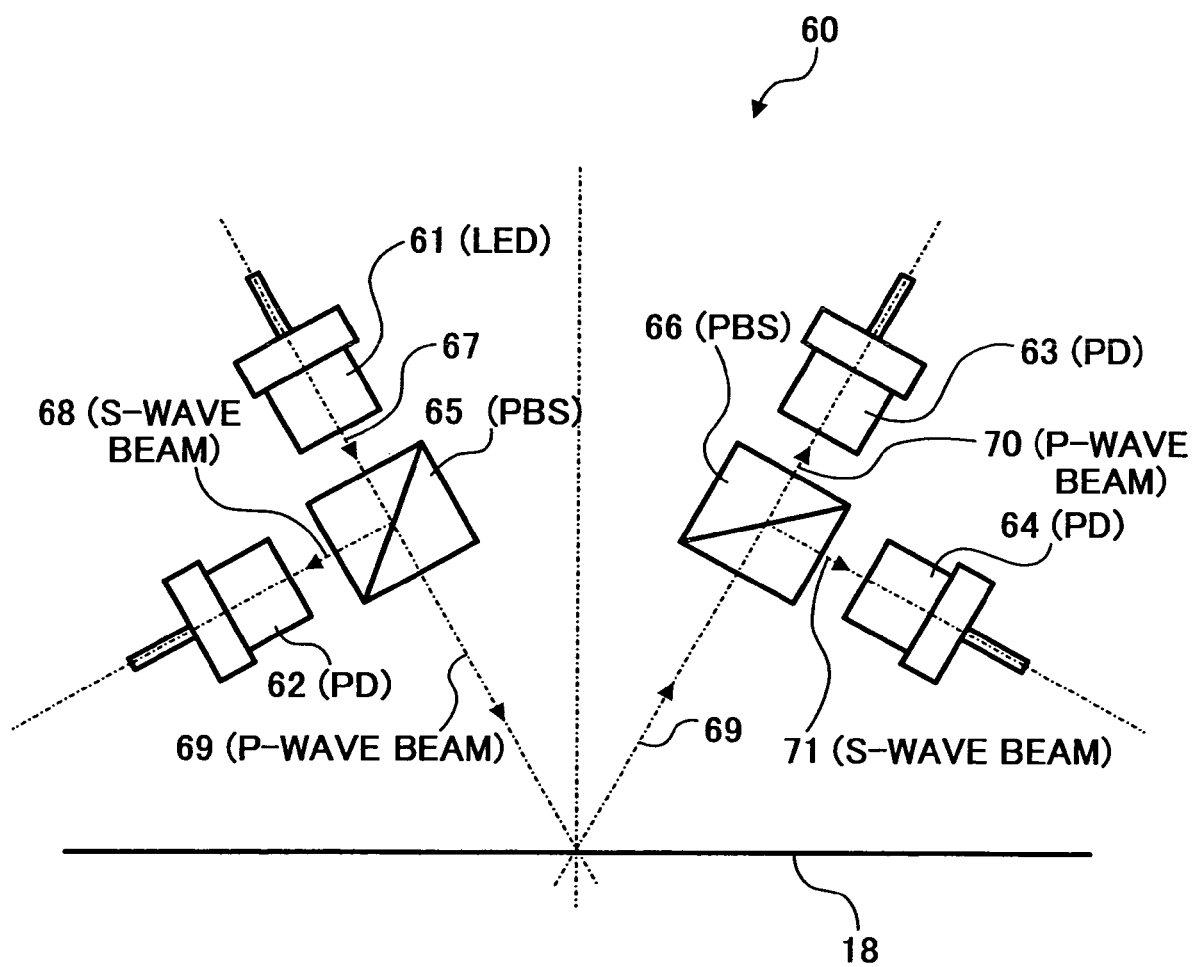
FIG. 31 schematic diagram of an alignment pattern detecting sensor according to the second embodiment of the present invention.

One example of using the beam splitter is explained below with reference to FIG. 31. An alignment pattern detecting sensor 60 as the alignment pattern detector of the second embodiment includes one light emitting diode (LED) 61 as a light emitter, three photodiodes (PD) 62, 63, and 64 as light receivers, and two polarized beam splitters (PBS) 65 and 66.

Flood light 67 emitted from the LED 61 is randomly polarized, but the PBS 65 splits the light 67 into a light component (S-wave beam) vibrating vertically with respect to the light incident plane and a light component (P-wave beam) vibrating parallel with respect to the light incident plane. The S-wave beam 68 is reflected by the PBS 65 and enters the PD

62. The P-wave beam 69 transmits the PBS 65 and is cast to the alignment pattern on the transfer belt 18.

The polarized state of the P-wave beam 69 reflected by the alignment pattern becomes random due to irregular reflection, and the P-wave beam 69 is split into a P-wave beam 70 and an S-wave beam 71 by the PBS 66. The P-wave beam 70 transmits the PBS 66 and enters the PD 63, and the S-wave beam 71 is reflected by the PBS 66 and enters the PD 64.

In the second embodiment, the PDs 62, 63, and 64 as light receivers receive diffused reflected component, not the diffused light.

Figure 32:
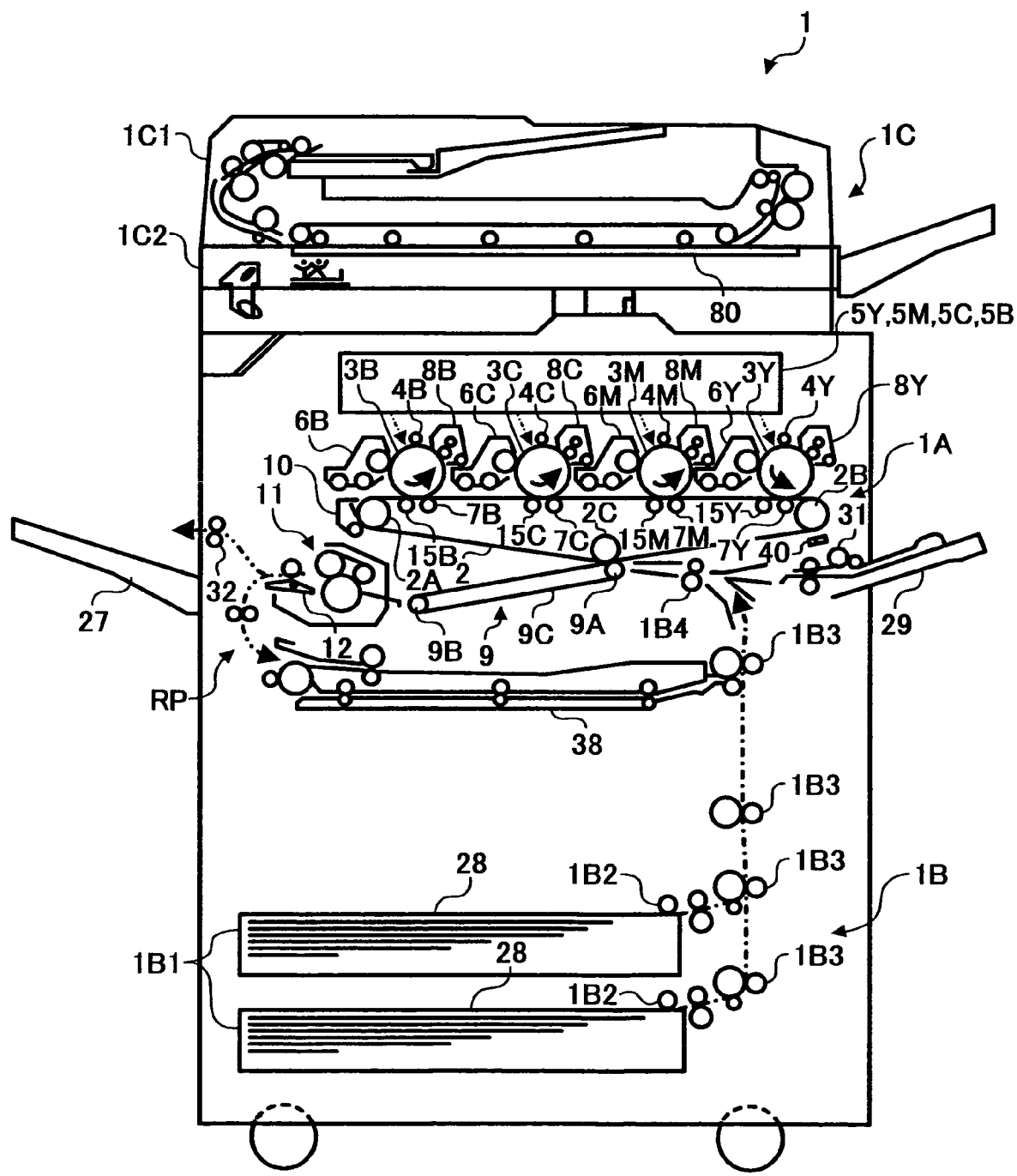
FIG. 32 is a schematic diagram of a color copying machine as an image forming apparatus according to the third embodiment of the present invention.

In the first and second embodiments, the examples of applying the present invention to the color image forming apparatus of four-drum tandem and direct transfer system are explained. However, as illustrated in FIG. 32, the present invention is applicable to an image forming apparatus of using a method of transferring images to an intermediate transfer element in the configuration of the four-drum tandem type and collectively transferring the images to a recording medium in the above-mentioned manner.

The third embodiment of the present invention that is applied to this type of color image forming apparatus is explained below.

In this embodiment, the alignment patterns Pm and Ps are formed on an intermediate transfer belt 2 as the intermediate transfer element, and these patterns are detected by the alignment pattern detecting sensor 40 arranged near a support roller 2B. The misalignment correcting unit is similar to that of the first embodiment.

The configuration and operation of a tandem type color copying machine as the image forming apparatus in this embodiment is schematically explained below. The color copying machine 1 has an image forming section 1A located at the center of the body of the apparatus, a paper feed section 1B located below the image forming section 1A, and an image read section 1C located above the image forming section 1A.

The intermediate transfer belt 2 is arranged as a transfer element having a transfer plane extending horizontally, and a device for forming an image having a complementary relation with a color-separated color is provided on the upper surface of the intermediate transfer belt 2. In other words, photosensitive elements 3Y, 3M, 3C, and 3B, as image carriers capable of carrying images with toners of colors (yellow, magenta, cyan, and black) having the complementary relation, are arranged in tandem with one another, along the transfer plane of the intermediate transfer belt 2.

The photosensitive element 3 (3Y, 3M, 3C, 3B) is formed of a drum rotatable in the counterclockwise direction. Around each of the drums, devices are provided as follows. That is, a charging device 4 (4Y, 4M, 4C, 4B) as a charger that executes the image forming processing in the rotation process, an optical write device 5 (5Y, 5M, 5C, 5B) as an exposing unit that forms an electrostatic latent image having a potential $V_L$ on each of the respective photosensitive elements 3Y, 3M, 3C, and 3B, based on the image information, a developing device 6 (6Y, 6M, 6C, 6B) as a developing unit that develops the electrostatic latent image on the photosensitive element 3 with a toner having the same polarity as that of the electrostatic latent image, a transfer bias roller 7 (7Y, 7M, 7C, 7B) as a primary transfer unit, a voltage applying member 15 (15Y, 15M, 15C, 15B), and a cleaning device 8 (8Y, 8M, 8C, 8B). The alphabet added to each reference numeral respectively corresponds to the color of the toner, as in the photosensitive element 3. The developing devices 6 contain respective color toners.

The intermediate transfer belt 2 is wound around among a plurality of rollers 2A to 2C, and is capable of moving in the same direction at positions that face the photosensitive elements 3Y, 3M, 3C, and 3B, respectively. The roller 2C separate from the rollers 2A and 2B for supporting the transfer plane faces a secondary transfer device 9 with the intermediate transfer belt 2 put therebetween. The image forming section 1A in FIG. 32 further includes a cleaning device 10 for the intermediate transfer belt 2.

The surface of the photosensitive element 3Y is uniformly charged by the charging device 4Y, and an electrostatic latent image is formed on the photosensitive element 3Y at a writing density (=resolution) of 600 dpi based on the image information from the image read section 1C. The electrostatic latent image is visualized as a toner image by the tow-component (carrier and toner) developing device 6Y that contains the yellow toner, and the toner image is attracted to the intermediate transfer belt 2 by an electric field due to the voltage applied to the transfer bias roller 7Y and transferred to the intermediate transfer belt 2, as a first transfer step.

The voltage applying member 15Y is provided on the upstream side of the transfer bias roller 7Y in the rotating direction of the photosensitive element 3Y. The voltage applying member 15Y applies a voltage to the intermediate transfer belt 2. Specifically, the voltage has the same polarity as the charged polarity of the photosensitive element 3Y and has an absolute value larger than a voltage $V_L$ in the solid portion. The voltage is applied so as to prevent toner from being transferred from the photosensitive element 3Y to the intermediate transfer belt 2 before the toner image comes into an area for image transfer, to thereby prevent toner fly-off due to dust when the toner is transferred from the photosensitive element 3Y to the intermediate transfer belt 2.

In the other photosensitive elements 3M, 3C, and 3B, the similar image formation is performed, though the toner color is different, and the toner images of the respective colors are sequentially transferred to the intermediate transfer belt 2 so as to be superposed on one another.

The toner remaining on the photosensitive element 3 after the image is transferred is removed by the cleaning device 8, and thereafter, the potential of the photosensitive element 3 is initialized by a decharging lamp (not shown), for the next image forming step.

The secondary transfer device 9 has a transfer belt 9C wound around between a charging drive roller 9A and a driven roller 9B and moving in the same direction as that of the intermediate transfer belt 2. By charging the transfer belt 9C by the charging drive roller 9A, a multi-color image superposed on the intermediate transfer belt 2 or a single-color image carried thereon can be transferred to the paper 28 as a transfer material.

The paper 28 is fed from the paper feed section 1B to a secondary transfer position. The paper feed section 1B includes a plurality of paper feed cassettes 1B1 in which the paper 28 is stacked, a paper feed roller 1B2 that separates and feeds the paper 28 sequentially from the uppermost paper one by one, a conveying roller pair 1B3, and a registration roller pair 1B4 located on the upstream of the secondary transfer position.

The paper 28 fed from the paper feed cassette 1B1 is once stopped by the registration roller pair 1B4, a skew deviation of the paper is corrected, and the paper is fed to the secondary transfer position by the registration roller pair 1B4, at a timing at which the front end of the toner image on the intermediate transfer belt 2 coincides with a predetermined position at the front end of the paper in the conveying direction. A manual feed tray 29 is provided on the right side of the apparatus body so as to be folded. The paper 28 stocked in the manual feed tray 29 is fed by a paper feed roller 31 toward the registration roller pair 1B4 through a conveying path joined with a paper conveying path from the paper feed cassette 1B1.

The optical write devices 5 control write beams each based on the image information from the image read section 1C or the image information output from a computer (not shown) to emit the write beams corresponding to the image information to the photosensitive elements 3Y, 3M, 3C, and 3B, to thereby form electrostatic latent images, respectively.

The image read section 1C has an automatic document feeder 1C1, and a scanner 1C2 having a contact glass 80 as a document placing table. The automatic document feeder 1C1 has a configuration such that the document ejected onto the contact glass 80 can be reversed to allow scanning on both surfaces of the document.

The electrostatic latent image on the photosensitive element 3 is visualized by the developing device 6 to obtain a visible image, and the visible image is primarily transferred to the intermediate transfer belt 2. The toner image in each color is superposedly transferred to the intermediate transfer belt 2, and then the image is secondarily transferred collectively to the paper 28 by the secondary transfer device 9. The paper 28 with the image secondarily transferred thereto is sent to a fixing device 11, where an unfixed image is fixed thereon by heat and pressure. The toner remaining on the intermediate transfer belt 2 after the secondary transfer is removed by the cleaning device 10.

The paper 28 having passed through the fixing device 11 is selectively guided to a conveying path toward a paper output tray 27 and a reverse conveying path RP, by a conveying path switching claw 12 provided on the downstream side of the fixing device 11. When conveyed toward the paper output tray 27, the paper 28 is ejected onto the paper output tray 27 by a paper ejecting roller pair 32, and stacked. When guided to the reverse conveying path RP, the paper 28 is reversed by a reversing device 38, and then sent to the registration roller pair 1B4 again.

With the configuration, in the color copying machine 1, by scanning a document placed on the contact glass 80 through exposure or by the image information from a computer, an electrostatic latent image is formed on the uniformly charged photosensitive element 3. After the electrostatic latent image is visualized by the developing device 6 to obtain a toner image, the toner image is primarily transferred to the intermediate transfer belt 2.

The toner image on the intermediate transfer belt 2 is directly transferred to the paper 28 sent out from the paper feed section 1B, when it is a single image. If it is a multi-color image, the toner images are superposed by repeating the primary transfer, and these images are secondarily transferred to the paper 28 collectively.

The paper 28 with the images secondarily transferred thereto is conveyed to the fixing device 11 where an unfixed image is fixed, and the paper 28 is ejected onto the paper output tray 27, or reversed and sent to the registration roller pair 1B4 again for forming images on both surfaces of the paper.

Figure 33:
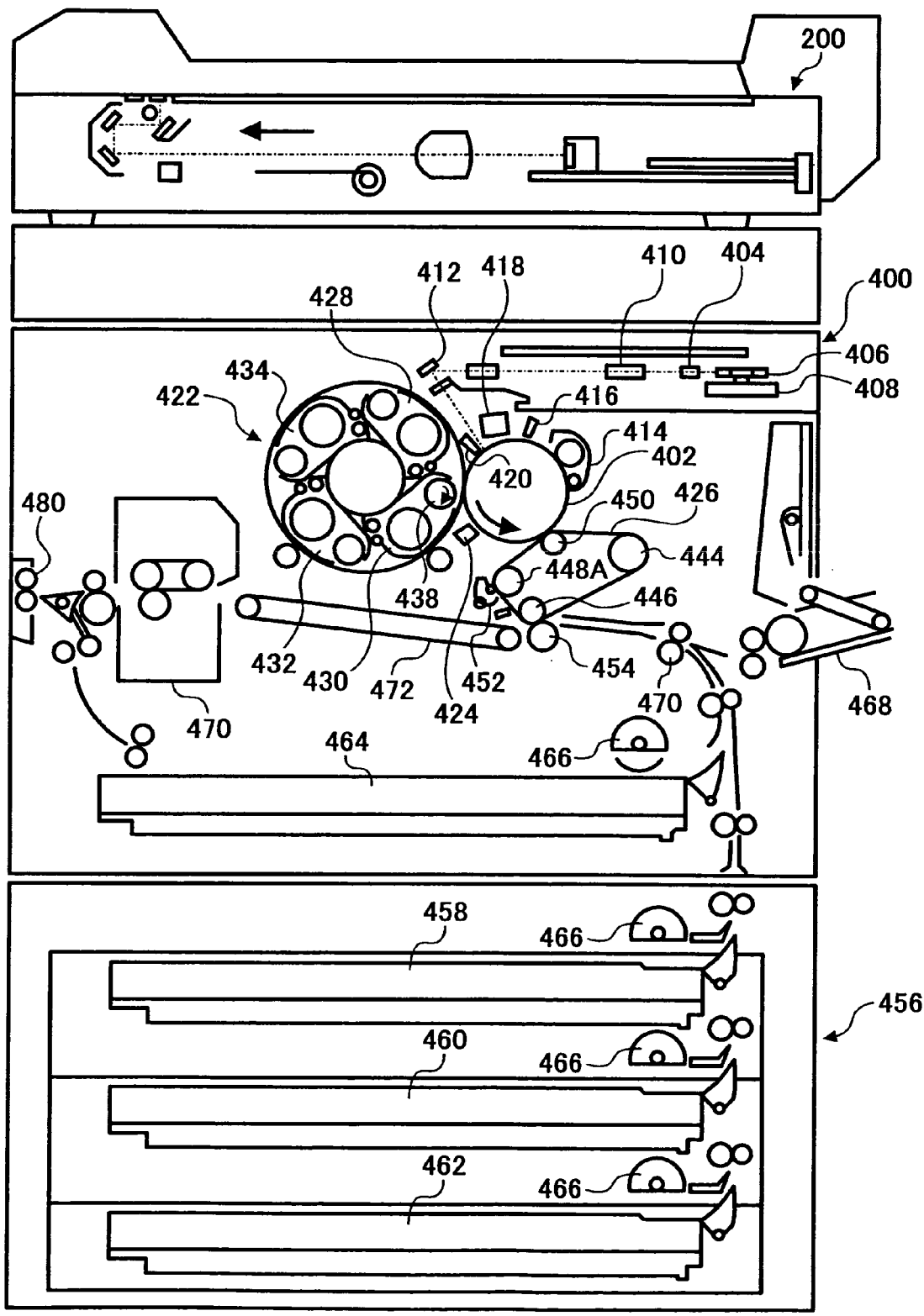
FIG. 33 is a schematic diagram of a color copying machine as an image forming apparatus according to the fourth embodiment of the present invention.

The fourth embodiment of the present invention will be explained below. This invention can be similarly executed in a color image forming apparatus of a type in which toner images in the respective colors are formed, using one photosensitive drum and a revolver type developing device, the respective toner images are transferred to an intermediate transfer element by superposition, and the toner images are collectively transferred to the recording medium as a sheet-type recording medium. One example of the embodiment is shown in FIG. 33.

In the fourth embodiment, the alignment patterns Pm and Ps are formed on an intermediate transfer belt 426 as the intermediate transfer element, and these patterns are detected by the alignment pattern detecting sensor 40 arranged near a drive roller 444. The misalignment correcting unit is the same as that of the first embodiment.

The configuration of the color copying machine as the image forming apparatus in this embodiment is explained below.

In the color copying machine, an optical write unit 400 as an exposing unit converts the data for a color image from a color scanner 200 to optical signals and performs optical writing corresponding to the document image, to thereby form an electrostatic latent image on a photosensitive drum 402 as an image carrier at a writing density (=resolution) of 600 dpi.

The optical write unit 400 includes a laser diode 404, a polygon mirror 406, a rotation motor 408 for the mirror 406, an f/θ lens 410, and a reflection mirror 412.

The photosensitive drum 402 is rotated in the counterclockwise direction as shown by an arrow. Around the photosensitive drum 402, there are arranged a photosensitive element cleaning unit 414, a decharging lamp 416, a potential sensor 420, a developing unit selected from a revolver type developing device 422, a developing density pattern detector 424, and the intermediate transfer belt 426 as the intermediate transfer element.

The revolver type developing device 422 has a developing unit for black 428, a developing unit for cyan 430, a developing unit for magenta 432, a developing unit for yellow 434, and a rotation drive section (not shown) that rotates the respective developing units. The developing units are so-called two-component developer type developing units each containing mixed developer of carrier and toner. Each of the developing units has the same configuration as the developing device 4 shown in the above embodiment. The same goes for the conditions and specification for the magnetic carrier.

In the standby state, the developing device 422 is set at the position for black development. When the copying operation is started, the data for a black image is started to be read in the color scanner 200 at a predetermined timing, and optical writing with the laser beam is started based on the image data, and an electrostatic latent image (black latent image) is formed.

In order to start developing from the front end of the black latent image, a developing sleeve is rotated before the front end of the latent image reaches the development position of the developing unit for black 428, to develop the black latent image with the black toner. A toner image having a negative polarity is formed on the photosensitive drum 402.

Thereafter, the developing operation in the area of the black latent image is continued, but when the rear end of the latent image has passed the black developing position, the revolver type developing device 422 is promptly rotated from the developing position for the black to the developing position for the next color. This operation is completed at least before arrival of the front end of a latent image that is formed based on the next image data.

When the image forming cycle is started, at first, the photosensitive drum 402 is rotated in the counterclockwise direction as shown by the arrow, and the intermediate transfer belt 426 is rotated in the clockwise direction, by a drive motor (not shown). With the rotation of the intermediate transfer belt 426, a black toner image is formed, a cyan toner image is formed, a magenta toner image is formed, and a yellow toner image is formed, and finally, the toner images are superposed on each other on the intermediate transfer belt 426 (primary transfer), in order of black (Bk), cyan (C), magenta (M), and yellow (Y) to thereby form a toner image.

The intermediate transfer belt 426 is stretched between respective support members, that is, a primary transfer electrode roller 450 facing the photosensitive drum 402, the drive roller 444, a secondary transfer facing roller 446 facing the secondary transfer roller 454, and a cleaning facing roller 448A facing the cleaning unit 452 that cleans the surface of the intermediate transfer belt 426. The intermediate transfer belt 426 is controlled by the drive motor (not shown).

The respective toner images of black, cyan, magenta, and yellow sequentially formed on the photosensitive drum 402 are accurately registered in order on the intermediate transfer belt 426 to thereby form an image with the four colors superposed on one another on the transfer belt 426. This image is collectively transferred to the paper by the secondary transfer facing roller 446.

A feed paper bank 456 has recording paper cassettes 458, 460, and 462 that store paper in various sizes different from the size of the paper stored in the cassette 464 of the apparatus body. Of these cassettes, size-specified paper is fed from a corresponding cassette by a paper feed roller 466 and conveyed toward the registration roller pair 470. In FIG. 33, reference numeral 468 denotes a manual feed tray for paper for an over head projector (OHP), thick paper, and the like.

When the image formation is initiated, the paper is fed from a feeding port of any of the cassettes, and stands by at a nip portion of the registration roller pair 470. The registration roller pair 470 is driven so that when the front end of the toner image on the intermediate transfer belt 426 approaches the secondary transfer facing roller 446, the front end of the paper coincides with the front end of the image, to thereby perform registration between the paper and the image.

In this manner, the paper is superposed on the intermediate transfer belt 426, and passes under the secondary transfer facing roller 446 to which a voltage having the same polarity as that of the toner is applied. At the time of the application, the toner image is transferred to the paper. Subsequently, the paper is decharged, and separated from the intermediate transfer belt 426 to be moved onto the paper conveyor belt 472.

The paper with the four-color superposed toner image is conveyed to the belt fixing type fixing device 470 by the paper conveyor belt 472, and the toner image is fixed on the paper by the fixing device 470 using heat and pressure. The paper with the image fixed is ejected to the outside of the apparatus by an ejection roller pair 480, and stacked in a tray (not shown). Through the steps, a full color copy is obtained.

The alignment pattern detecting sensor explained above in the present invention is applicable to any image forming apparatus that detects a misalignment and corrects it, by detecting an alignment pattern formed with a plurality of two-color superposed patches. Therefore, this sensor is also applicable as a misalignment detecting sensor of an ink jet device. One example of this embodiment is explained with reference to FIG. 34 to FIG. 36.

Figure 34:
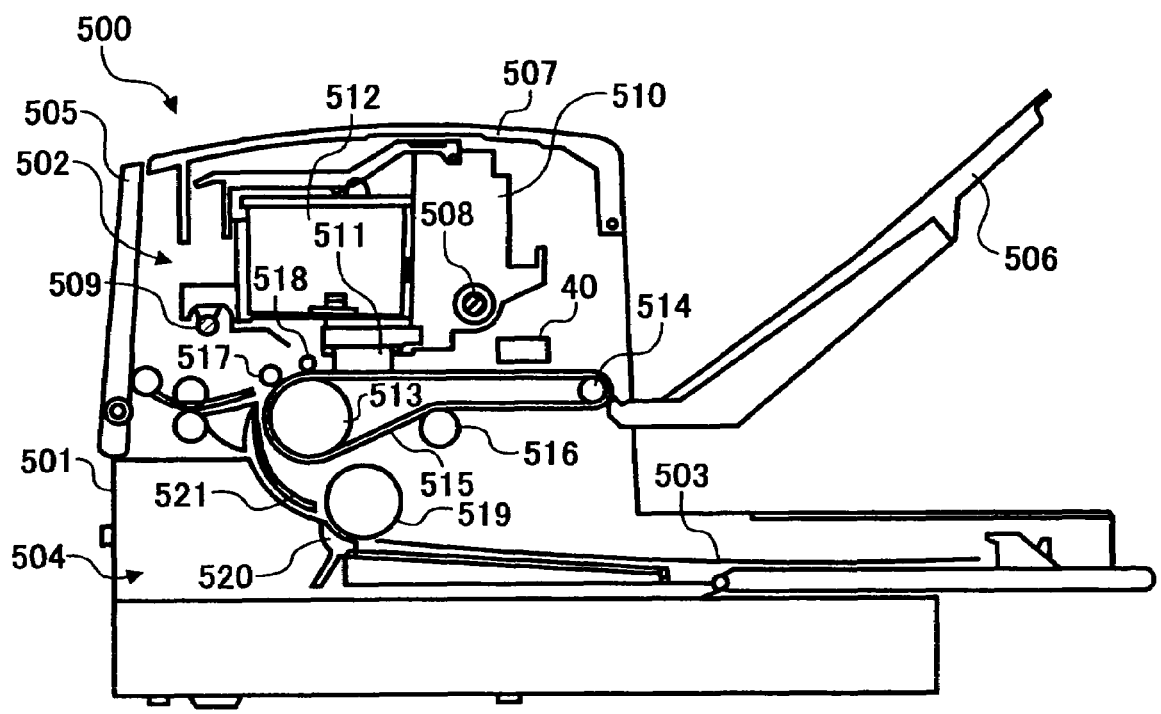
FIG. 34 is a schematic diagram of an ink jet printer as an image forming apparatus according to the fifth embodiment of the present invention.

In the fifth embodiment, the schematic configuration and printing function of an ink jet printer 500 as an image forming apparatus are explained with reference to FIG. 34. The ink jet printer 500 has a printing mechanism section 502 inside the body 501 of the printer. This section 502 includes a carriage movable in the main scanning direction, a recording head comprising an ink jet head mounted on the carriage, and an ink cartridge for supplying ink to the recording head, A paper feed cassette 504 that can accommodate paper 503 as a sheet-type recording medium is provided in the lower part of the printer body 501, and the paper feed cassette 504 is detachably provided with respect to the printer body 501 from the front side (from left side in the figure) of the printer.

A manual feed tray 505 is provided on the front face of the printer body 501 so as to be freely opened or closed. Therefore, the paper 503 fed from the paper feed cassette 504 or the manual feed tray 505 is conveyed to the printing mechanism section 502 where a specified image is printed thereon at a writing density (=resolution) of 600 dpi, and the paper 503 is ejected to a paper output tray 506 provided at the backside of the printer body 501. An upper cover 507 is provided on the upper surface of the printer body 501 so as to be freely opened or closed.

In the printing mechanism section 502, the carriage 510 is slidably held by a main guide rod 508 and a sub-guide rod 509 supported between right and left side plates (not shown) in the main scanning direction (perpendicular to the face of paper). A recording head 511 includes an ink jet head having nozzles for discharging ink drops for the respective colors of yellow (Y), cyan (C), magenta (M), and black (Bk), and is provided on the lower side of the carriage 510. Respective ink cartridges 512 for supplying the ink of the respective colors to the recording head 511 are provided on the upper side of the carriage 510 so as to be replaceable.

The recording head 511 may be one in which a plurality of heads for discharging ink drops in each color are arranged along the main scanning direction, or one in which one head having nozzles for discharging ink drops in each color is used.

Provided under the recording head 511 is a conveyor belt 515 that electrostatically attracts and conveys the paper 503 is wound around between a conveying roller 513 and a driven roller 514, in order to convey the paper 503 in the sub-scanning direction with respect to the position of printing by the recording head 511. Tension is given to the conveyor belt 515 by an intermediate roller 516.

At a position facing the conveying roller 513, with the conveyor belt 515 put therebetween, a bias roller 517 for charging the conveyor belt 515 is disposed. A press roller 518 for pressing the paper 503 against the conveyor belt 515 is disposed near a starting point of a flat portion of the conveyor belt 515. Here, the starting point of the flat portion means a portion where the conveyor belt 515 is separated from the conveying roller 513 to be stretched in parallel with the recording head 511.

The paper 503 stored in the paper feed cassette 504 is separated one by one in order of the uppermost paper by a paper feed roller 519 and a friction pad 520, and conveyed by a curved guide member 521 toward a nip portion of the bias roller 517 and the conveyor belt 515.

The alignment pattern detecting sensor 40 that detects the alignment pattern Pm formed on the paper 503 is provided above the conveyor belt 515 on the downstream side in the paper conveying direction. The misalignment correcting unit is the same as that of the first embodiment.

Figure 35:
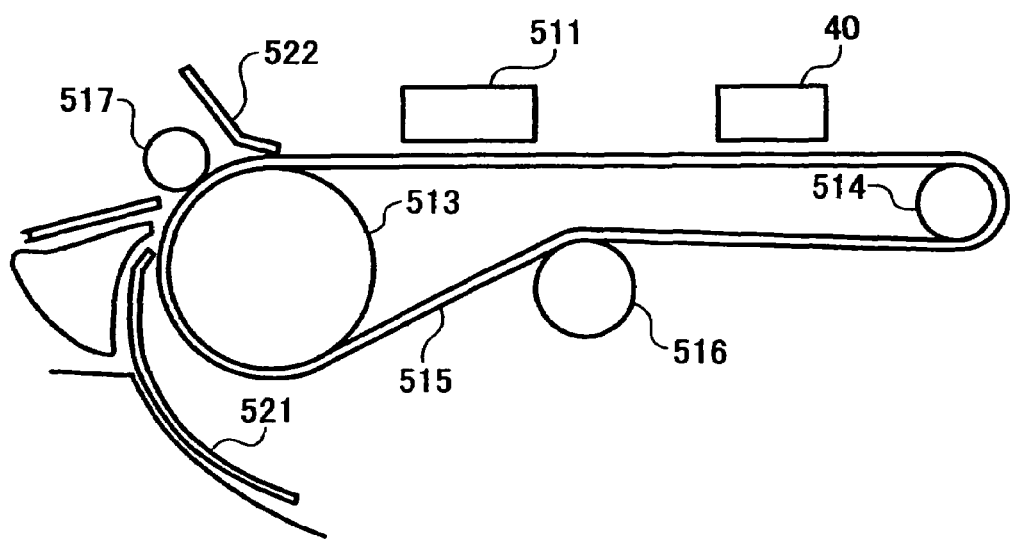
FIG. 35 is an enlarged diagram of a conveyor belt and nearby parts in FIG. 34.

FIG. 35 is an enlarged diagram illustrating the periphery of the conveyor belt 515. A plate-like retainer 522 may be provided instead of the press roller 518 shown in FIG. 34.

Figure 36:
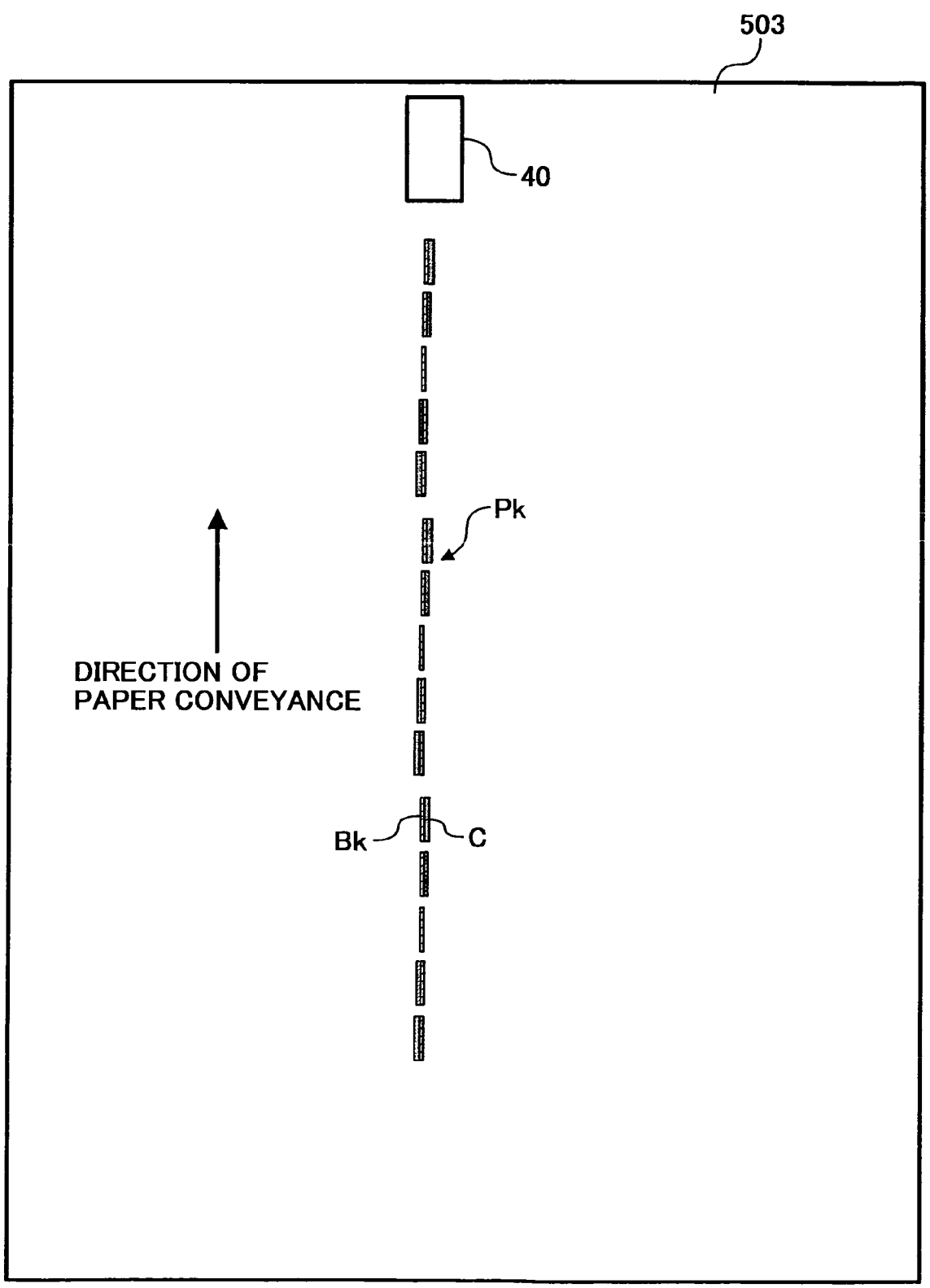
FIG. 36 is a schematic diagram of the positional relation of the alignment pattern and the alignment pattern detecting sensor in the ink jet printer.

As illustrated in FIG. 36, an alignment pattern Pk as illustrated in FIG. 37 is formed on the paper 503 as a transfer element on which an alignment pattern is formed, and this pattern is detected by the alignment pattern detecting sensor 40 to thereby correct the color misalignment.

As explained above, according to one aspect of the present invention, it is possible to improve the linearity, that is, to improve detection accuracy of the alignment pattern detecting sensor or the alignment pattern detector of the image forming apparatus.

Moreover, the alignment pattern detecting sensor or the alignment pattern detector of the image forming apparatus obtains the following advantageous effects.

(1) It is possible to perform highly accurate detection at a sampling frequency as low as about $\frac{1}{100}$ as compared with the conventional edge detection method.

(2) As a result of (1), there is no need to speed up processing of the processing section after the sampling process. Thus, it is possible to largely reduce the cost of the electronic hardware.

(3) Since the linearity of the two lines is extremely improved, it is possible to largely reduce the number of patches that forms the alignment pattern.

(4) As a result of (3), the processing time required for adjustment like misalignment adjustment that has nothing to do with ordinary printing can be largely reduced. Thus, it is possible to extremely improve productivity.

Furthermore, it is possible to enhance the accuracy of misalignment detection in the alignment pattern detecting sensor or the alignment pattern detector of the image forming apparatus.

Moreover, it is possible to prevent calculation of an intersection point from being disabled.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus comprising:
an alignment pattern forming unit that forms an alignment pattern on a medium as a plurality of patches shifted with respect to one another by an arbitrary amount, each of the patches being formed by superposing a line image of a reference color and a line image of a sample color other than the reference color;
an alignment pattern detector that detects the alignment pattern; and
a misalignment correcting unit that determines, based on output signals of the alignment pattern detector, an amount and a direction of a misalignment between the line images of the reference color and sample color, and corrects the misalignment, wherein an acceptance width of the alignment pattern detector, a line width of the alignment pattern, and a writing density of the image forming apparatus satisfy following inequality (line width)/(acceptance width) <($\alpha \times$writing density (dpi))$^{-\beta}$.

2. The image forming apparatus according to claim 1, wherein $\alpha$ is 5.0627, and $\beta$ is 0.5331.

3. The image forming apparatus according to claim 1, wherein
the alignment pattern is formed on the medium by superposing a line image of a reference color and a line image of a sample color other than the reference color to make a plurality of lines as one patch, and arranging a plurality of patches in which a relative position between the line images of the two colors is continuously shifted by a predetermined amount.

4. The image forming apparatus according to claim 1, wherein the reference color is black.

5. The image forming apparatus according to claim 1, further comprising:
a plurality of image carriers on which toner images are formed; and
a transfer element to which the toner images are sequentially transferred, wherein the reference color is set to black, and a toner image of the black is transferred lastly to be superposed on other toner images or the transfer element.

6. The image forming apparatus according to claim 5, wherein
a lightness L* of the transfer element, on which the alignment pattern is formed, is equal to or less than 40.

7. An image forming apparatus comprising:
an alignment pattern forming unit that forms an alignment pattern on a medium as a plurality of patches shifted with respect to one another by an arbitrary amount, each of the patches being formed by superposing a line image of a reference color and a line image of a sample color other than the reference color;
an alignment pattern detector that detects the alignment pattern; and
a misalignment correcting unit that determines, based on output signals of the alignment pattern detector, an amount and a direction of a misalignment between the line images of the reference color and sample color, and corrects the misalignment, wherein an acceptance width of the alignment pattern detector, a line width of the alignment pattern, and a writing density of the image forming apparatus satisfy following inequality (line width)/(acceptance width) <($\alpha \times$writing density (dpi))$^{-\beta}$, wherein
the acceptance width is determined based on a required line width satisfying the inequality, wherein the required line width is calculated from a maximum misalignment between the line images of the reference color and sample color.

8. The image forming apparatus according to claim 7, wherein
the required line width is equal to or more than twice the maximum misalignment.

* * * * *

UNITED STATES PATENT AND TRADEMARK OFFICE
CERTIFICATE OF CORRECTION

PATENT NO.       : 7,438,379 B2                                  Page 1 of 1
APPLICATION NO.  : 11/406260
DATED            : October 21, 2008
INVENTOR(S)      : Ishibashi et al.

It is certified that error appears in the above-identified patent and that said Letters Patent is hereby corrected as shown below:

On the Title page, the Terminal Disclaimer information has been omitted. Item (45) and the Notice information should read as follows:

Item -- (45) **Date of Patent: * Oct. 21, 2008**

(*) Notice:   Subject to any disclaimer, the term of this patent is extended or adjusted under 35 U.S.C. 154(b) by 0 days.

This patent is subject to a terminal disclaimer. --

Signed and Sealed this

Thirtieth Day of December, 2008

JON W. DUDAS
*Director of the United States Patent and Trademark Office*